(12) United States Patent
Kamijima

(10) Patent No.: US 7,181,827 B2
(45) Date of Patent: Feb. 27, 2007

(54) METHOD OF FORMING MAGNETIC LAYER PATTERN

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 246 days.

(21) Appl. No.: 10/995,464

(22) Filed: Nov. 24, 2004

(65) Prior Publication Data

US 2005/0118329 A1    Jun. 2, 2005

(30) Foreign Application Priority Data

Nov. 27, 2003    (JP)    ............................ 2003-398006

(51) Int. Cl.
*G11B 5/127* (2006.01)
*G11B 5/147* (2006.01)

(52) U.S. Cl. ............................... 29/603.07; 29/603.01; 29/603.03; 29/603.13; 29/603.14; 360/126; 360/123

(58) Field of Classification Search ............. 29/603.07, 29/603.13, 603.14, 603.01; 360/126, 123, 360/317; 427/273, 282, 286, 130; 430/67
See application file for complete search history.

(56) References Cited

U.S. PATENT DOCUMENTS

| | | | | | |
|---|---|---|---|---|---|
| 6,130,805 | A | * | 10/2000 | Sasaki et al. | ................ 360/126 |
| 6,154,346 | A | * | 11/2000 | Sasaki | .......................... 360/317 |
| 6,158,107 | A | * | 12/2000 | Chang et al. | ............. 29/603.14 |
| 6,477,006 | B1 | * | 11/2002 | Sato | ............................ 360/126 |
| 6,687,084 | B2 | | 2/2004 | Takahashi et al. | |
| 2002/0078553 | A1 | | 6/2002 | Sato | |

FOREIGN PATENT DOCUMENTS

| JP | A 06-102658 | 4/1994 |
|---|---|---|
| JP | A 2002-197609 | 7/2002 |
| JP | A 2002-197610 | 7/2002 |
| JP | A 2002-197611 | 7/2002 |
| JP | A 2002-197613 | 7/2002 |
| JP | A 2002-197615 | 7/2002 |
| JP | A 2003-086493 | 3/2003 |

* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

Provided is a method of manufacturing a thin film magnetic head capable of achieving compatibility between preventing the occurrence of side erasing and securing overwrite characteristics. When a pole portion layer as a portion where a magnetic flux is emitted is formed, a photoresist pattern is formed so that two frame portions which determine an aperture have a different width from each other, and then the photoresist pattern is heated to deform the frame portions. Thereby, the width of the aperture is gradually reduced toward a seed layer. After that, a precursor pole portion layer is formed in the aperture of the photoresist pattern, and the precursor pole portion layer is polished so as to form an air bearing surface, thereby the pole portion layer is formed so that an exposed surface exposed to the air bearing surface has an asymmetrical inverted trapezoidal shape. On the basis of the characteristic shape of the exposed surface, compatibility between preventing the occurrence of side erasing and securing the overwrite characteristics is achieved.

11 Claims, 21 Drawing Sheets

METHOD OF FORMING MAGNETIC LAYER PATTERN

BACKGROUND OF THE INVENTION

1. Field of the Invention

The present invention relates to a method of forming a magnetic layer pattern, and a method of manufacturing a thin film magnetic head for manufacturing a thin film magnetic head comprising at least an inductive magnetic transducer for recording through the method of forming a magnetic layer pattern.

2. Description of the Related Art

In recent years, an improvement in performance of a thin film magnetic head mounted in a magnetic recording apparatus (for example, a hard disk drive) has been sought in accordance with an increase in the areal density of a magnetic recording medium (for example, a hard disk). As recording systems of the thin film magnetic head, for example, a longitudinal recording system in which a signal magnetic field is oriented in an in-plane direction (a longitudinal direction) of a hard disk and a perpendicular recording system in which the signal magnetic field is oriented in a direction perpendicular to a surface of the hard disk are well known. At present, the longitudinal recording system is widely used, but in consideration of market forces in accordance with an improvement in areal density, it is assumed that the perpendicular recording system instead of the longitudinal recording system holds promise for the future, because the perpendicular recording system can obtain advantages that higher linear recording density can be achieved, and a hard disk in which data has been already recorded has resistance to thermal decay effects.

The perpendicular recording system thin film magnetic head comprises, for example, a thin film coil generating a magnetic flux, and a pole layer emitting the magnetic flux generated in the thin film coil to the hard disk to perform a recording process. The pole layer includes an exposed surface exposed to an air bearing surface, and the exposed surface has, for example, a rectangular shape. In the thin film magnetic head, when a current flows into the thin film coil, a magnetic flux for recording is generated in the thin film coil. Then, when the magnetic flux is emitted from the pole layer to the hard disk, the hard disk is magnetized by a magnetic field (perpendicular magnetic field) for recording which is generated by the magnetic flux, so information is magnetically recorded on the hard disk.

In order to improve the recording performance of the perpendicular recording system thin film magnetic head, for example, it is required to minimize the effect of a failure generally called "side erasing". Side erasing is a phenomenon in which when information is recorded on a track to be recorded (hereinafter simply referred to as "target track") on the hard disk, information is also recorded on a track adjacent to the target track (hereinafter simply referred to as "adjacent track") without intention, thereby information which has been already recorded on the adjacent track is overwritten and erased.

Side erasing occurs mainly due to skew of the thin film magnetic head. The skew is a phenomenon in which when a suspension (which is a leaf spring holding a slider) is moved to a track direction during recording on the hard disk drive, the thin film magnetic head is slightly inclined toward the rotation direction of the hard disk, that is, an extending direction of tracks on the hard disk. When the thin film magnetic head is skewed, an unnecessary perpendicular magnetic field is generated by a magnetic flux concentrated onto a point except for an original recording point (trailing edge) corresponding to the target track in the pole layer, so the adjacent track is overwritten by the unnecessary perpendicular magnetic field. Therefore, in order to prevent an adverse effect by side erasing, for example, it is necessary to design the pole layer so that the occurrence of side erasing due to the skew can be prevented.

Therefore, some techniques regarding the structure and the manufacturing method of a thin film magnetic head capable of preventing the occurrence of side erasing due to the skew have been already proposed.

More specifically, for example, a pole layer including an exposed surface with a symmetrical inverted trapezoidal shape instead of a rectangular shape is known, and a technique of forming a pole layer having a configuration of this kind is also known. In the forming technique, after forming a photoresist pattern having an aperture so that the width of the aperture is gradually reduced toward the bottom through the use of the deformation effect of a photoresist by heating, the pole layer is formed by using the photoresist pattern (for example, refer to Japanese Unexamined Patent Application Publication Nos. 2002-197611, 2002-197613 and 2002-197615).

FIGS. 37 through 40 are illustrations for describing steps of forming a conventional pole layer having an exposed surface with the above described symmetrical inverted trapezoidal shape in detail, and FIGS. 37 through 40 show sectional views parallel to an air bearing surface of a completed thin film magnetic head.

In order to form the pole layer, at first, as shown in FIG. 37, after a seed layer 102 is formed on a supporting substrate 101, a photoresist is applied to a surface of the seed layer 102 so as to form a photoresist film 103. Next, a mask 104 having an aperture 104K corresponding to the planar shape of the pole layer is used to pattern (expose and develop) the photoresist film 103 through photolithography, thereby as shown in FIG. 38, a photoresist pattern 105 having an aperture 105K with a substantially uniform width in a thickness direction (a Z-axis direction in the drawing) is formed. Then, the photoresist pattern 105 is heated, thereby as shown in FIG. 39, the photoresist pattern 105 is deformed so that the width of the aperture 105K is gradually reduced toward the substrate 101. Next, the seed layer 102 is used to selectively grow a plating film in the aperture 105K of the photoresist pattern 105, thereby a precursor pole layer 106Z is pattern-formed in the aperture 105K. Then, after removing the photoresist pattern 105, the seed layer 102 is selectively etched by using the precursor pole layer 106Z as a mask so as to remove an unnecessary portion (a portion not coated with the precursor pole layer 106Z) of the seed layer 102, as shown in FIG. 40. Finally, the precursor pole layer 106Z is polished from a side where an air bearing surface is formed to form the air bearing surface, thereby the pole layer including an exposed surface exposed to the air bearing surface is completed. The exposed surface of the pole layer has a shape corresponding to the shape of cross section of the precursor pole layer 106Z shown in FIG. 40, that is, a symmetrical inverted trapezoidal shape.

However, in the pole layer including the above exposed surface with a symmetrical inverted trapezoidal shape, for example, depending upon a skew angle (a tilt angle of the pole layer) determined on the basis of the structure of the hard disk drive, in the case where the shape of the exposed surface of the pole layer is designed in order to prevent the occurrence of side erasing due to the skew, if the area of the exposed surface is too small, an advantage that an adverse effect due to side erasing can be prevented can be obtained;

however, the intensity of a magnetic field for recording declines due to a decrease in the amount of a magnetic flux emitted from the pole layer with a decrease in the area of the exposed surface, so overwrite characteristics which is one of important factors determining the recording performance of the thin film magnetic head may be degraded. The overwrite characteristics are characteristics that information recorded in the hard disk is overwritten with new information. Therefore, in order to stably secure the recording performance of the thin film magnetic head, it is necessary to establish a method of forming a pole layer capable of achieving compatibility between preventing the occurrence of side erasing due to the skew and securing the overwrite characteristics. In this case, specifically in consideration of mass production of the thin film magnetic head, it is important to establish a forming method capable of easily forming the pole layer through existing manufacturing processes.

SUMMARY OF THE INVENTION

In view of the foregoing, it is a first object of the invention to provide a method of manufacturing a thin film magnetic head capable of achieving compatibility between preventing the occurrence of side erasing and securing overwrite characteristics.

Moreover, it is a second object of the invention to provide a method of manufacturing a thin film magnetic head capable of easily manufacturing a thin film magnetic head through existing manufacturing processes.

Further, it is a third object of the invention to provide a method of forming a magnetic layer pattern which can be applied to the method of manufacturing a thin film magnetic head according to the invention.

In a method of manufacturing a thin film magnetic head according to the invention, the thin film magnetic head comprises a thin film coil generating a magnetic flux, and a pole layer extending from a recording-medium-facing surface which faces a recording medium moving in a direction of medium movement to the rear, and including a pole portion emitting the magnetic flux generated in the thin film coil to the recording medium, and a step of forming the pole portion in the pole layer comprises: a first step of forming a photoresist pattern on a base layer so that the photoresist pattern includes a first frame portion and a second frame portion which face each other in a width direction and determine an aperture, and the first frame portion and the second frame portion have a different width from each other; a second step of heating the photoresist pattern so as to deform the first frame portion and the second frame portion so that the widths thereof are gradually increased toward the base layer, thereby the width of the aperture is gradually reduced toward the base layer; a third step of pattern-forming a precursor pole portion for forming the pole portion at least in the aperture by using the photoresist pattern; a fourth step of removing the photoresist pattern; and a fifth step of polishing the precursor pole portion from a side where the recording-medium-facing surface is formed to form the recording-medium-facing surface, thereby pattern-forming the pole portion so as to have an exposed surface exposed to the recording-medium-facing surface on the base layer, and the pole portion is formed so that the exposed surface has a trapezoidal shape in which one edge being positioned in the direction of medium movement and determining a first base angle and a second base angles is a longer side in a pair of sides parallel to each other, and the other edge is a shorter side in the pair of sides, and the first base angle and the second base angle are different from each other.

In the method of manufacturing a thin film magnetic head according to the invention, the pole portion is formed through a method of forming a magnetic layer pattern according to the invention, so the pole portion can be easily formed through existing manufacturing processes so that the exposed surface has an asymmetrical inverted trapezoidal shape.

In a method of forming a magnetic layer pattern according to the invention, the magnetic layer pattern extends to a predetermined extending direction, and the method comprises: a first step of forming a photoresist pattern on a base layer so that the photoresist pattern includes a first frame portion and a second frame portion which face each other in a width direction and determine an aperture, and the first frame portion and the second frame portion have a different width from each other; a second step of heating the photoresist pattern so as to deform the first frame portion and the second frame portion so that the widths thereof are gradually increased toward the base layer, thereby the width of the aperture is gradually reduced toward the base layer; a third step of forming a magnetic layer pattern in the aperture by using the photoresist pattern; and a fourth step of removing the photoresist pattern, wherein the magnetic layer pattern is formed so that an end surface in the extending direction has a trapezoidal shape in which one edge determining a first base angle and a second base angles is a longer side in a pair of sides parallel to each other, and the other edge is a shorter side in the pair of sides, and the first base angle and the second base angle are different from each other.

In the method of forming a magnetic layer pattern according to the invention, after the photoresist pattern is formed so that the first frame portion and the second frame portion which determine the aperture have a different width from each other, the photoresist pattern is heated so as to deform the first frame portion and the second portion so that the widths thereof are gradually increased toward the base layer, thereby the width of the aperture is gradually reduced toward the base layer. Thereby, the magnetic layer pattern is formed in the aperture of the photoresist pattern so that an end surface in an extending direction has an asymmetrical inverted trapezoidal shape. Moreover, when the magnetic layer pattern is formed, only existing manufacturing processes are used.

Specifically, in the method of manufacturing a thin film magnetic head or the method of forming a magnetic layer pattern according to the invention, when the pole portion or the magnetic layer pattern is formed, in the width direction, the first base angle is positioned corresponding to the first frame portion and the second base angle is positioned corresponding to the second frame portion, and in the first step, the photoresist pattern may be formed so that the first frame portion has a smaller width than the width of the second frame portion, thereby the first base angle is be larger than the second base angle, or the photoresist pattern may be formed so that the first frame portion has a larger width than the width of the second frame portion, thereby the first base angle is smaller than the second base angle.

In the method of manufacturing a thin film magnetic head according to the invention, the pole portion is formed through the method of forming a magnetic layer pattern according to the invention so that the exposed surface has an asymmetrical inverted trapezoidal shape, so a thin film magnetic head capable of achieving compatibility between preventing the occurrence of side erasing and securing overwrite characteristics can be manufactured. Moreover, the thin film magnetic head can be easily manufactured through existing manufacturing processes.

In the method of forming a magnetic layer pattern according to the invention, the magnetic layer pattern can be easily formed through existing manufacturing processes so that an end surface in an extending direction has an asymmetrical inverted trapezoidal shape, so the method of forming a magnetic layer pattern according to the invention can be applied to the method of manufacturing a thin film magnetic head according to the invention.

Other and further objects, features and advantages of the invention will appear more fully from the following description.

DETAILED DESCRIPTION OF THE PREFERRED EMBODIMENTS

A preferred embodiment of the invention will be described in more detail below referring to the accompanying drawings.

Figures 1A, 1B:
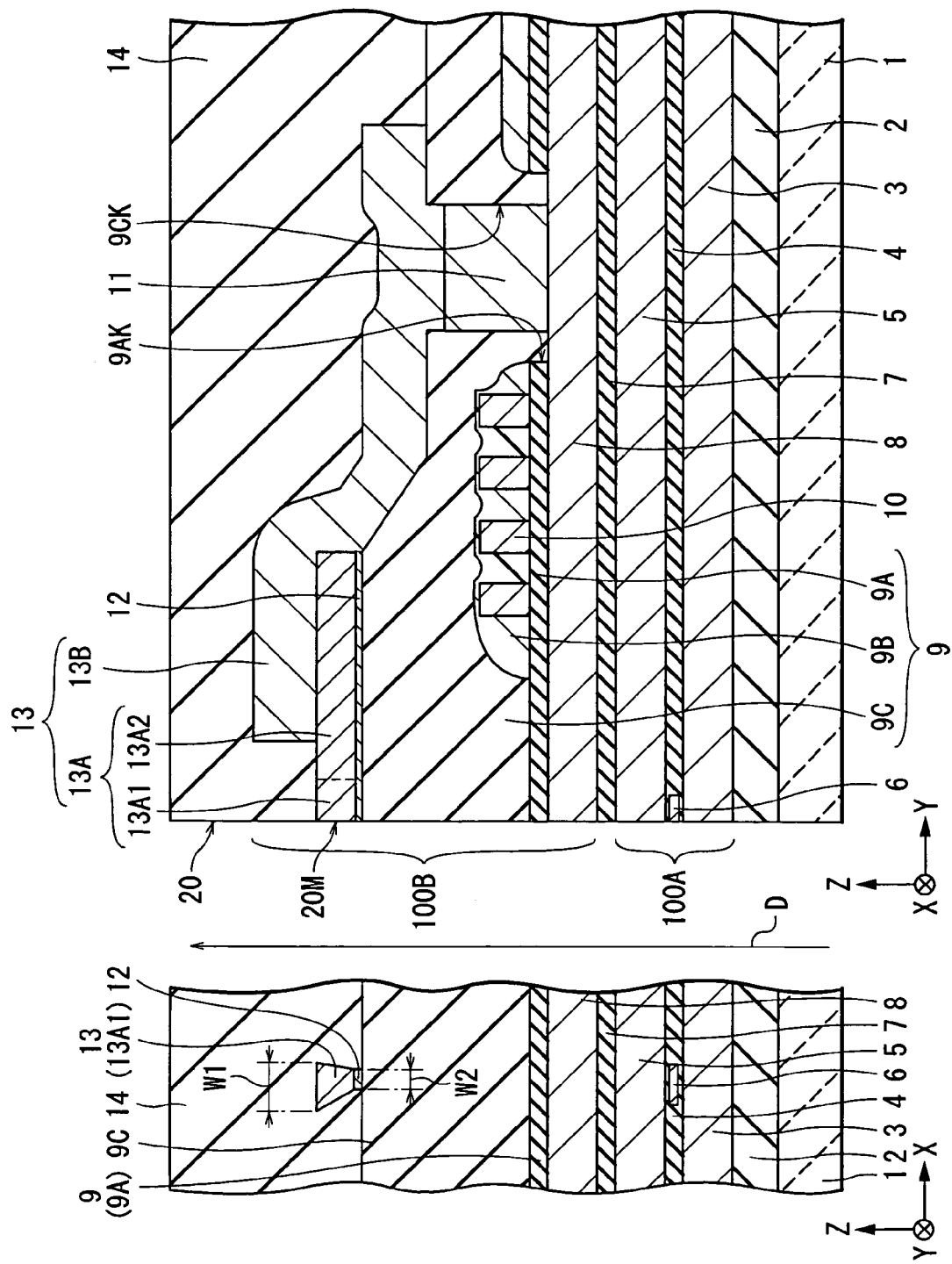
FIGS. 1A and 1B are sectional views of a thin film magnetic head manufactured through a method of manufacturing a thin film magnetic head according to an embodiment of the invention.
Figure 2:
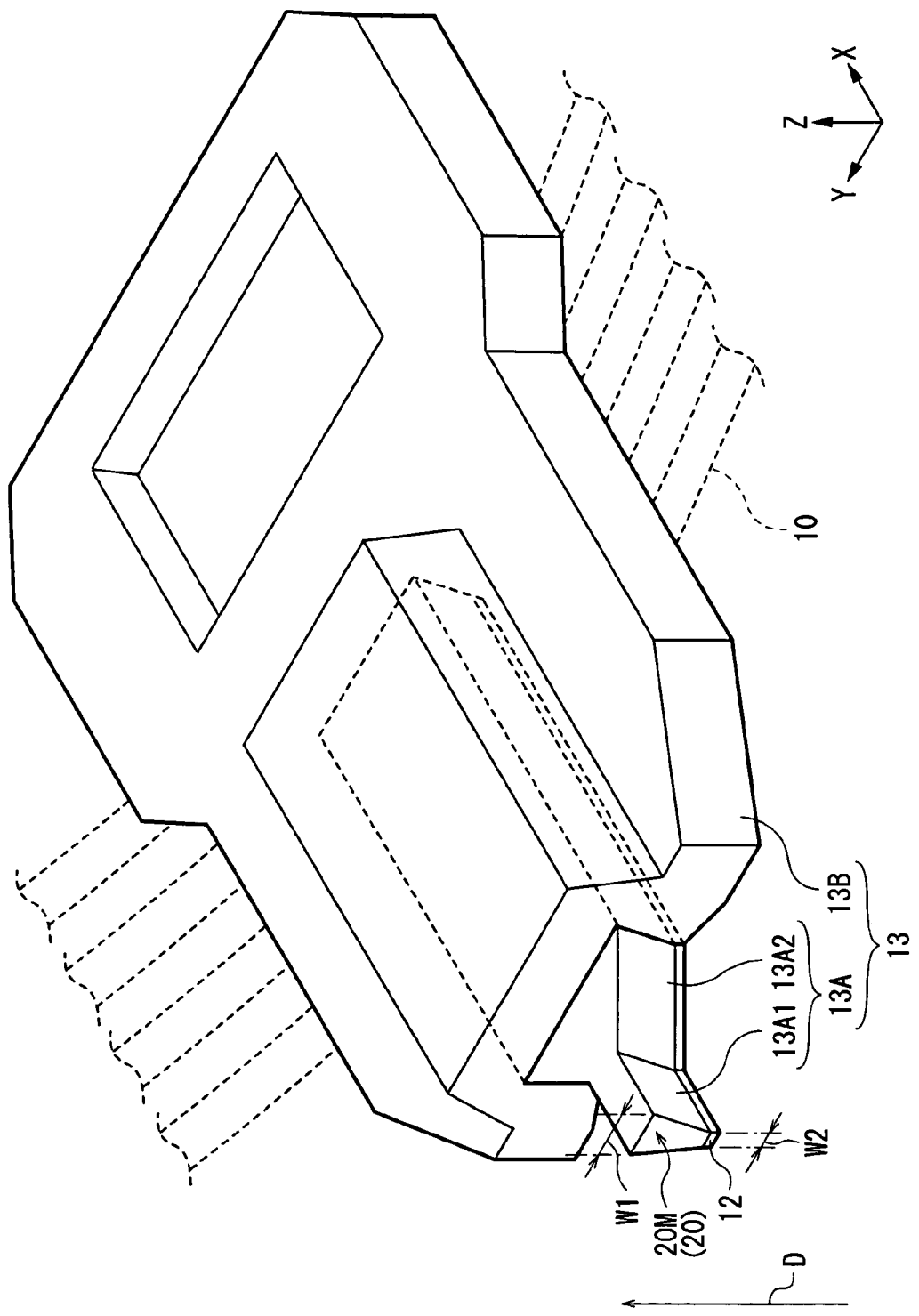
FIG. 2 is a perspective view of a main part of the thin film magnetic head shown in FIGS. 1A and 1B.

At first, referring to FIGS. 1A, 1B and 2, the structure of a thin film magnetic head manufactured through a method of manufacturing a thin film magnetic head according to an embodiment of the invention will be described below. FIGS. 1A and 1B show sectional views of the thin film magnetic head, and FIG. 2 shows an enlarged perspective view of a main part of the thin film magnetic head shown in FIGS. 1A and 1B. FIG. 1A shows a sectional view parallel to an air bearing surface, and FIG. 1B shows a sectional view perpendicular to the air bearing surface. An up arrow D shown in FIGS. 1A, 1B and 2 indicates a direction where a magnetic recording medium (not shown) relatively moves with respect to the thin film magnetic head (direction of medium movement).

Figure 3:
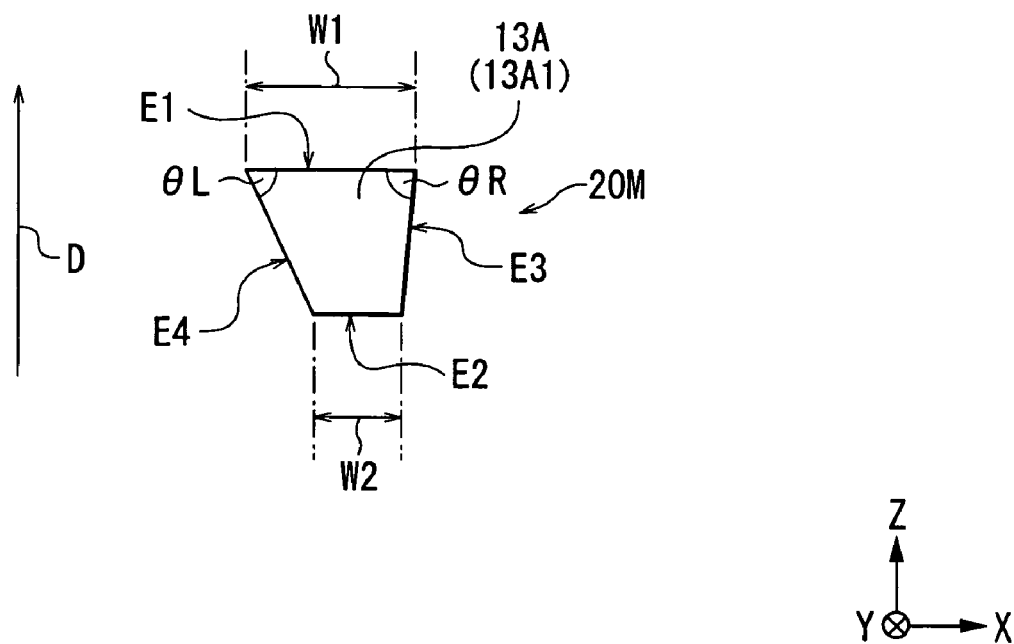
FIG. 3 is a plan view of an exposed surface of a pole portion layer.

In the following description, a dimension in an X-axis direction, a dimension in a Y-axis direction and a dimension in a Z-axis direction in FIGS. 1A, 1B and 2 are expressed as "width", "length" and "thickness", respectively. Further, a side closer to the air bearing surface in the Y-axis direction is expressed as "front", and the opposite side is expressed as "rear". In FIG. 3 or later drawings, these expressions are the same.

For example, the thin film magnetic head is mounted in a magnetic recording apparatus such as a hard disk drive to perform a magnetic process on a magnetic recording medium (hereinafter simply referred to as "recording medium") such as a hard disk which moves in the direction D of medium movement. More specifically, the thin film magnetic head is, for example, a composite head capable of implementing both of a recording process and a reproducing process as the magnetic process. As shown in FIGS. 1A and 1B, the thin film magnetic head has a structure in which an insulating layer 2 made of, for example, a non-magnetic insulating material such as aluminum oxide ($Al_2O_3$; hereinafter simply referred to as "alumina"), a reproducing head portion 100A performing a reproducing process by using a magnetoresistive (MR) effect, a separating layer 7 made of, for example, a non-magnetic insulating material such as alumina, a recording head portion 100B performing a recording process by a perpendicular recording system and an overcoat layer 14 made of, for example, a non-magnetic insulating material such as alumina are laminated in this order on a substrate 1 made of a ceramic material such as AlTiC ($Al_2O_3$.TiC).

The reproducing head portion 100A include, for example, a bottom read shield layer 3, a shield gap film 4 and a top read shield layer 5 which are laminated in this order. An MR device 6 as a reproducing device is buried in the shield gap film 4 so that an end surface of the MR device 6 is exposed to a recording-medium-facing surface (air bearing surface) 20 facing the recording medium.

The bottom read shield layer 3 and the top read shield layer 5 are provided to magnetically separate the MR device 6 from its surroundings, and they extend from the air bearing surface 20 toward the rear. The bottom read shield layer 3 and the top read shield layer 5 are made of, for example, a magnetic material such as a nickel-iron alloy (NiFe (for example, Ni: 80 wt %, Fe: 20 wt %); hereinafter simply referred to as "Permalloy (trade name)") with a thickness of approximately 1.0 µm to 2.0 µm.

The shield gap film 4 is provided to electrically separate the MR device 6 from its surroundings, and is made of, for example, a non-magnetic insulating material such as alumina.

The MR device 6 is provided to perform a magnetic process (a reproducing process) by using, for example, a giant magnetoresistive (GMR) effect, a tunneling magnetoresistive (TMR) effect or the like.

The recording head portion 100B includes, for example, an auxiliary pole layer 8, a gap layer 9 in which a thin film coil 10 is buried, a coupling portion 11, a seed layer 12, and a main pole layer 13 magnetically coupled to the auxiliary pole layer 8 through the coupling portion 11 in an aperture 9CK disposed in the gap layer 9, which are laminated in this order. FIG. 2 mainly shows a perspective view of the main pole layer 13.

The auxiliary pole layer 8 is provided to return a magnetic flux emitted from the main pole layer 13 through the recording medium. The auxiliary pole layer 8 is made of, for example, a magnetic material such as Permalloy (Ni: 80 wt %, Fe: 20 wt %) with a thickness of approximately 1.0 µm to 2.0 µm.

The gap layer 9 includes a gap layer portion 9A being disposed on the auxiliary pole layer 8 and having an aperture 9AK, a gap layer portion 9B being disposed on the gap layer portion 9A so that gaps between windings of the thin film coil 10 and their surroundings are coated with the gap layer portion 9B, and a gap layer portion 9C being disposed so that the gap layer portions 9A and 9B are coated with the gap layer portion 9C, and having an aperture 9CK. The gap layer portion 9A is made of, for example, a non-magnetic insulating material such as alumina or silicon oxide ($SiO_2$) with a thickness of approximately 0.1 µm to 1.0 µm. The gap layer portion 9B is made of, for example, a non-magnetic insulating material such as a photoresist (photosensitive resin) or spin-on glass (SOG) exhibiting liquidity by heating. The gap layer portion 9C is made of, for example, a non-magnetic insulating material such as alumina or silicon oxide with a larger thickness than that of the gap layer portion 9B.

The thin film coil 10 is provided to generate a magnetic flux for recording. The thin film coil 10 is made of, for example, an electrically conductive material such as copper (Cu), and has a winding structure in a spiral shape while regarding the coupling portion 11 as a center. In FIGS. 1A, 1B and 2, only a part of a plurality of windings constituting the thin film coil 10 is shown.

The coupling portion 11 is provided to magnetically couple between the auxiliary pole layer 8 and the main pole layer 13, and is made of, for example, a magnetic material such as Permalloy (Ni: 80 wt %, Fe: 20 wt %).

The seed layer 12 is used to form a pole portion layer 13A, which will be described later, in the main pole layer 13, and is made of, for example, the same magnetic material as that of the pole portion layer 13A. A step of forming the pole portion layer 13A by using the seed layer 12 will be described later.

The main pole layer 13 is provided to contain the magnetic flux generated in the thin film coil 10 and emit the magnetic flux to the recording medium. The main pole layer 13 extends from the air bearing surface 20 toward the rear, and includes, for example, the pole portion layer 13A being disposed on a front portion of the gap layer portion 9C and a yoke portion layer 13B being disposed so that a rear portion of the pole portion layer 13A is coated with the yoke portion layer 13B from its surroundings.

The pole portion layer 13A functions as a magnetic flux emitting portion. The pole portion layer 13A is made of, for example, a magnetic material with a higher saturated magnetic flux density than that of the yoke portion layer 13B, and the thickness of the pole portion layer 13B is approximately 0.1 µm to 1.0 µm. As the material of the pole portion layer 13A, for example, a material including iron and nitrogen, a material including iron, zirconia and oxygen, a material including iron and nickel, and the like are cited, and more specifically, at least one kind selected from the group consisting of Permalloy (Ni: 45%, Fe: 55%), iron nitride (FeN), an iron-cobalt alloy (FeCo), an alloy including iron (FeM), and an alloy including iron and cobalt (FeCoM) is used. In the above formulas (FeM, FeCoM), M indicates, for example, at least one kind selected from the group consisting of nickel, nitrogen, carbon (C), boron (B), silicon, aluminum, titanium (Ti), zirconia, hafnium (Hf), molybdenum (Mo), tantalum (Ta), niobium (Nb) and copper.

The pole portion layer 13A includes, for example, a front end portion 13A1 (pole portion) which functions as a substantial magnetic flux emitting portion and determines the recording track width of the recording medium, and a rear end portion 13A2 which is magnetically coupled to the rear of the front end portion 13A1 in order from the air bearing surface 20. An end surface (exposed surface) 20M of the front end portion 13A1 is exposed to the air bearing surface 20. The structure of the pole portion layer 13A including the exposed surface 20M will be described in detail later (refer to FIG. 3).

The yoke portion layer 13B functions as a magnetic flux containing portion. The yoke portion layer 13B is made of, for example, a magnetic material with high corrosion resistance and higher resistance than that of the pole portion layer 13A with a thickness of approximately 1.0 µm to 2.0 µm. For example, in the case where a material with the same composition as that of the material of the pole portion layer 13A is used as the material of the yoke portion layer 13B, the material preferably contains a low content of iron in order that the material of the yoke portion layer 13B has a lower saturated magnetic flux density than that of the pole portion layer 13A. The yoke portion layer 13B is not exposed to the air bearing surface 20, and is disposed, for example, approximately 1.5 μm or over away from the air bearing surface 20.

Next, referring to FIGS. 1A, 1B, 2 and 3, the structure of the pole portion layer 13A will be described in detail below. FIG. 3 shows an enlarged plan view of the exposed surface 20M of the pole portion layer 13A.

As shown in FIG. 3, the exposed surface 20M of the front end portion 13A1 of the pole portion layer 13A has a rectangular shape including a top edge E1 (one edge) with a width W1 which is positioned on a trailing side and determines the recording track width of the recording medium, and a bottom edge E2 (the other edge) which faces the top edge E1 on a reading side, and has a smaller width W2 than the width W1 of the top edge E1 (W2<W1), two side edges E3 and E4 disposed in a width direction (a X-axis direction). More specifically, the exposed surface 20M has a trapezoidal shape (asymmetrical inverted trapezoidal shape) in which the top edge E1 determining two base angles θR (a first base angle) and θL (a second base angle) is a longer side in a pair of sides parallel to each other, and the bottom edge E2 is a shorter side in the pair of sides parallel to each other, and the above two base angles θR and θL are different from each other (θR≠θL). The above top edge E1 is a point where when information is recorded, the magnetic flux is concentrated so as to actually perform a recording process, that is, a so-called "trailing edge". The base angle θR is an angle determined by the top edge E1 and the side edge E3, and the base angle θL is an angle determined by the top edge E1 and the side edge E4. In FIG. 3, for example, the case where the base angle θR is larger than the base angle θL (θR>θL) is shown, and more specifically, the base angle θR is approximately 86°, and the base angle θL is approximately 76°. The base angles θR and θL can be set depending upon, for example, the occurrence of side erasing due to the skew of the thin film magnetic head as appropriate. When the movement of the recording medium toward a direction D of medium movement is considered as a flow, the above "trailing side" means a side where the flow outgoes (a side of the direction D of medium movement), and herein the trailing side is a top side in the thickness direction (Z-axis direction). On the other hand, a side where the flow incomes is called "a leading side", and herein the leading side is a bottom side in the thickness direction.

Moreover, the width of a rear part of the rear end portion 13A2 has a larger uniform width (for example, 2.0 μm) than the top edge width W1 of the front end portion 13A1, and the width of a front part of the rear end portion 13A2 is gradually reduced toward the front end portion 13A1.

Next, referring to FIGS. 1A, 1B, 2 and 3, actions of the thin film magnetic head will be described below.

In the thin film magnetic head, in recording information, when a current flows into the thin film coil 10 of the recording head portion 100B through an external circuit (not shown), a magnetic flux is generated in the thin film coil 10. The magnetic flux generated at this time is contained mainly in the main pole layer 13, and then flows from the yoke portion layer 13B to the pole portion layer 13A. After the magnetic flux is emitted from the exposed surface 20M of the front end portion 13A1 to the recording medium, the magnetic flux is returned to the auxiliary pole layer 8 through the recording medium. At this time, a recording magnetic field (a perpendicular magnetic field) is generated in a direction perpendicular to a surface of the recording medium on the basis of the magnetic flux emitted from the front end portion 13A1, and the recording medium is magnetized in a perpendicular direction by the recording magnetic field, so information is magnetically recorded in the recording medium.

On the other hand, in reproducing information, when a sense current flows into the MR device 6 of the reproducing head portion 10A, the resistance of the MR device 6 is changed depending upon a signal magnetic field for reproducing from the recording medium. A change in the resistance is detected as a change in the sense current so that the information recorded in the recording medium is read out.

Next, referring to FIGS. 1A and 1B through 24, as the method of manufacturing a thin film magnetic head according to the embodiment, a method of manufacturing the thin film magnetic head shown in FIGS. 1A, 1B, 2 and 3 will be described below. FIGS. 4 through 24 are illustrations for describing steps in the method of manufacturing the thin film magnetic head, and FIGS. 4 through 13 show sectional views and FIGS. 14 through 24 show plan views. FIGS. 14 through 23 show sectional views taken along a line A—A in FIGS. 4 through 13, respectively. A method of forming a magnetic layer pattern according to the invention is applied to form the front end portion 13A1 of the pole portion layer 13A in the method of manufacturing the thin film magnetic head according to the embodiment, so the method of forming a magnetic layer pattern will be described below, too.

At first, referring to FIGS. 1A and 1B, the method of manufacturing the thin film magnetic head will be briefly described below, and then referring to FIGS. 1A and 1B through 24, a method of forming a main part (the pole portion layer 13A) of the thin film magnetic head will be described in detail below. Further, the materials, dimensions and structural characteristics of components of the thin film magnetic head which have been already described in detail will not be further described below.

The thin film magnetic head is manufactured through laminating each component in order mainly through existing thin film processes including a film formation technique such as plating or sputtering, a patterning technique such as photolithography, an etching technique such as dry etching or wet etching, and the like. More specifically, as shown in FIGS. 1A and 1B, after the insulating layer 2 is formed on the substrate 1, the bottom read shield layer 3, the shield gap film 4 in which the MR device 6 is buried, and the top read shield layer 5 are laminated in this order on the insulating layer 2 so as to form the reproducing head portion 10A. Next, after the separating layer 7 is formed on the reproducing head portion 10A, the auxiliary pole layer 8, the gap layer 9 (gap layer portions 9A, 9B and 9C) in which the thin film coil 10 is buried, the coupling portion 11 filled in the aperture 9CK of the gap layer 9, the seed layer 12 and the main pole layer 13 (the pole portion layer 13A and the yoke portion layer 13) are formed in this order on the separating layer 7 so as to form the recording head portion 100B. Finally, the overcoat layer 14 is formed on the recording head portion 100B so as to complete the thin film magnetic head. More accurately, all of the above components of the thin film magnetic head are finally formed through polishing the laminate structure including all of the components through a machining process or a polishing process to form the air bearing surface 20.

Figure 4:
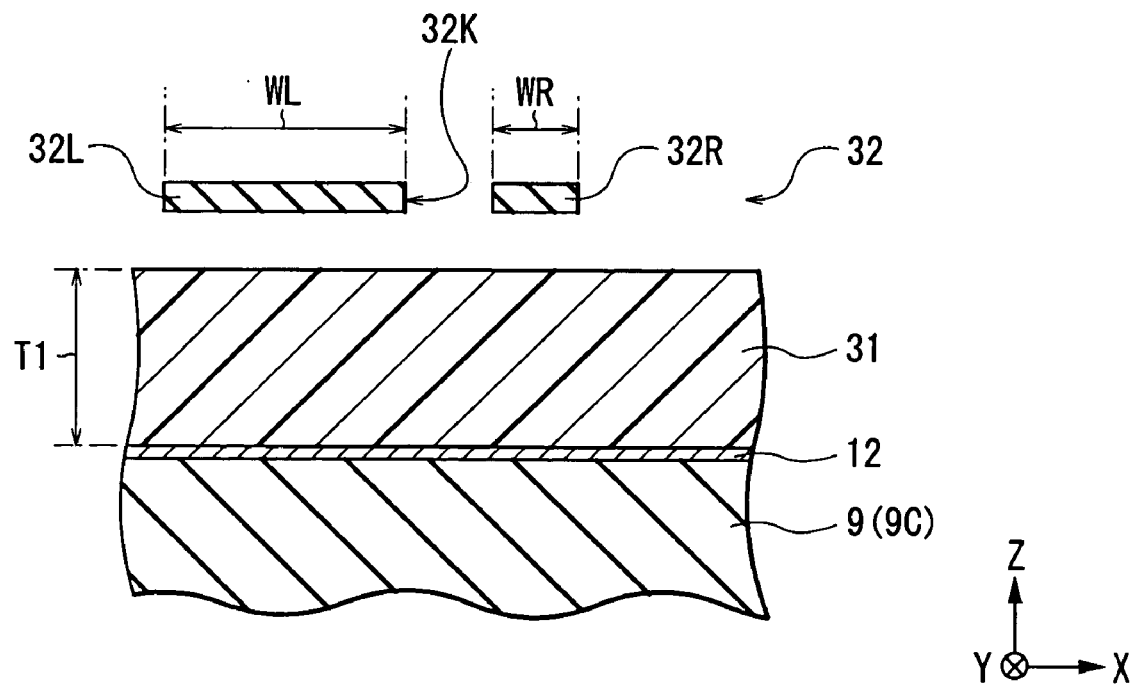
FIG. 4 is a sectional view for describing a step in the method of manufacturing a thin film magnetic head according to the embodiment of the invention.
Figure 14:
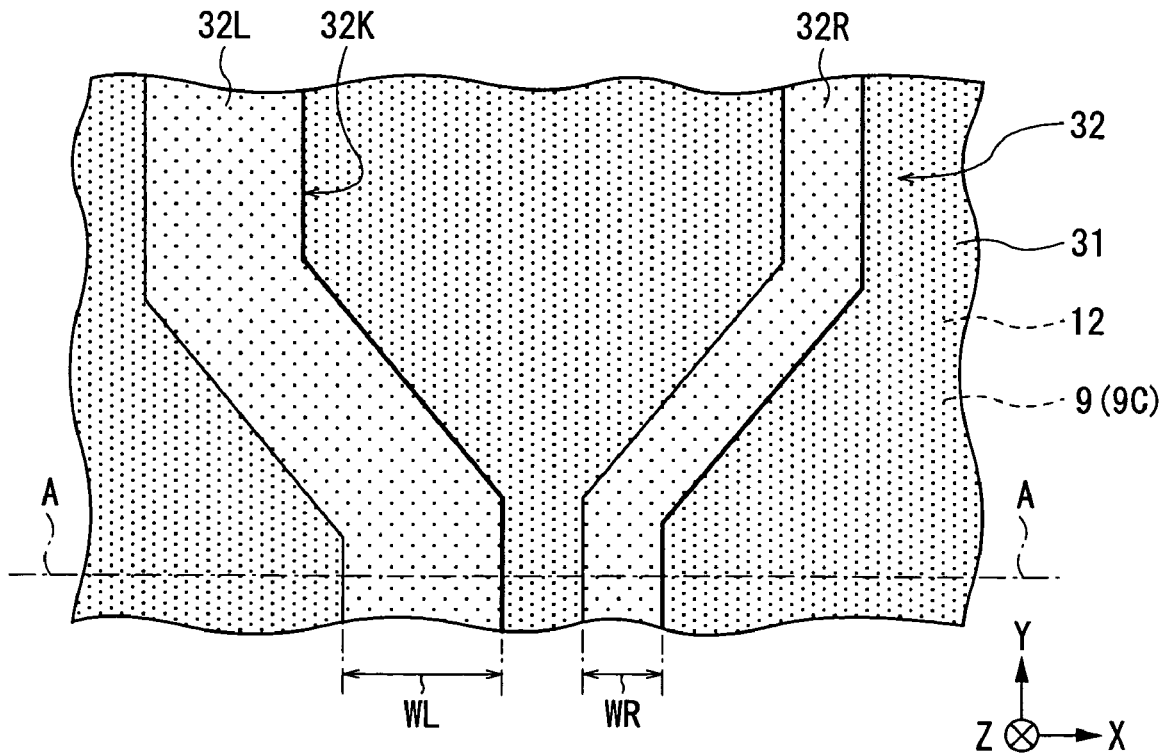
FIG. 14 is a plan view corresponding to FIG. 4.

In order to form the pole portion layer 13A, at first, as shown in FIGS. 4 and 14, after the gap layer 9 including the gap layer portion 9C is formed, the seed layer 12 (base layer) is formed on the gap layer 9 through, for example, sputtering so as to have a thickness of approximately 50 nm. The seed layer 12 is formed of, for example, the same magnetic material as that of the precursor pole portion layer 13AZ (refer to FIGS. 7 and 17) which is formed in a later step. As a technique of forming the seed layer 12, for example, any other film formation technique such as CVD (Chemical Vapor Deposition) can be used instead of the above sputtering.

Next, a surface of the seed layer 12 is coated with a photoresist, and the photoresist is heated as necessary. Thereby, as shown in FIGS. 4 and 14, the photoresist film 31 is formed with a thickness of approximately 0.5 μm. When the photoresist film 31 is formed, for example, the thickness T1 of the photoresist film 31 is adjusted so as to be larger than the thickness T2 (refer to FIG. 7) of the precursor pole portion layer 13AZ which is formed in a later step (T1>T2).

Then, as shown in FIGS. 4 and 14, the photoresist film 31 is patterned through photolithography by using the mask 32 with a predetermined pattern shape so as to correspond to the pattern shape of the mask 32. For example, as the mask 32, a mask with a pattern shape including two frame portions 32R and 32L which face each other in the width direction (the X-axis direction) and determine the aperture 32K, and have a different width from each other is used, and more specifically, a mask in which the aperture 32K has a substantially uniform width in the thickness direction (the Z-axis direction) and corresponds to a planar shape of the precursor pole portion layer 13AZ formed in a later step, and the width WR of the frame portion 32R is smaller than the width WL of the frame portion 32L (WR<WL) is used.

Figure 5:
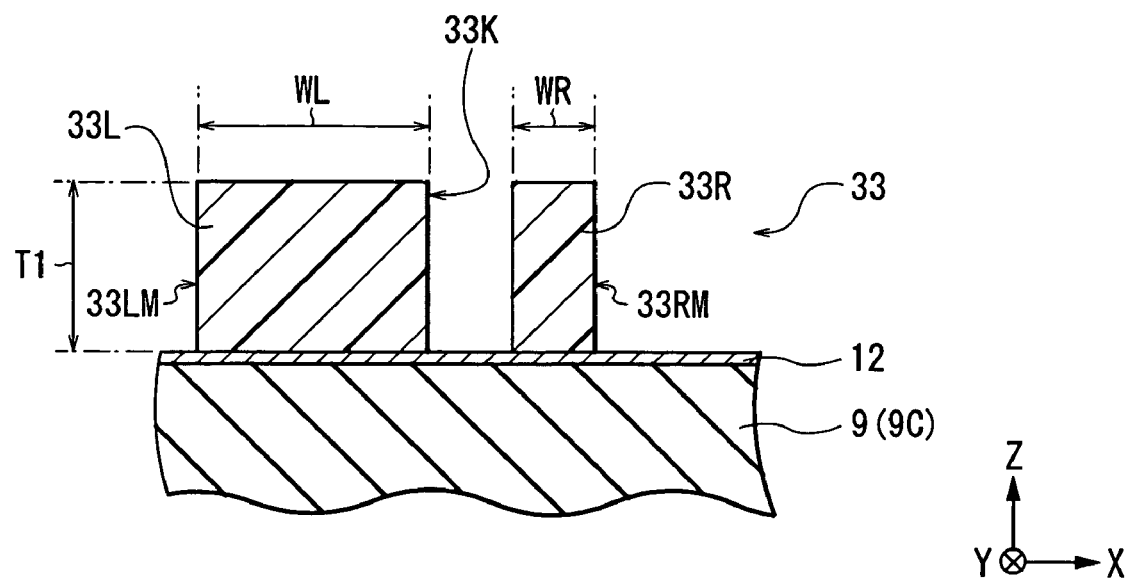
FIG. 5 is a sectional view for describing a step following the step of FIG. 4.
Figure 15:
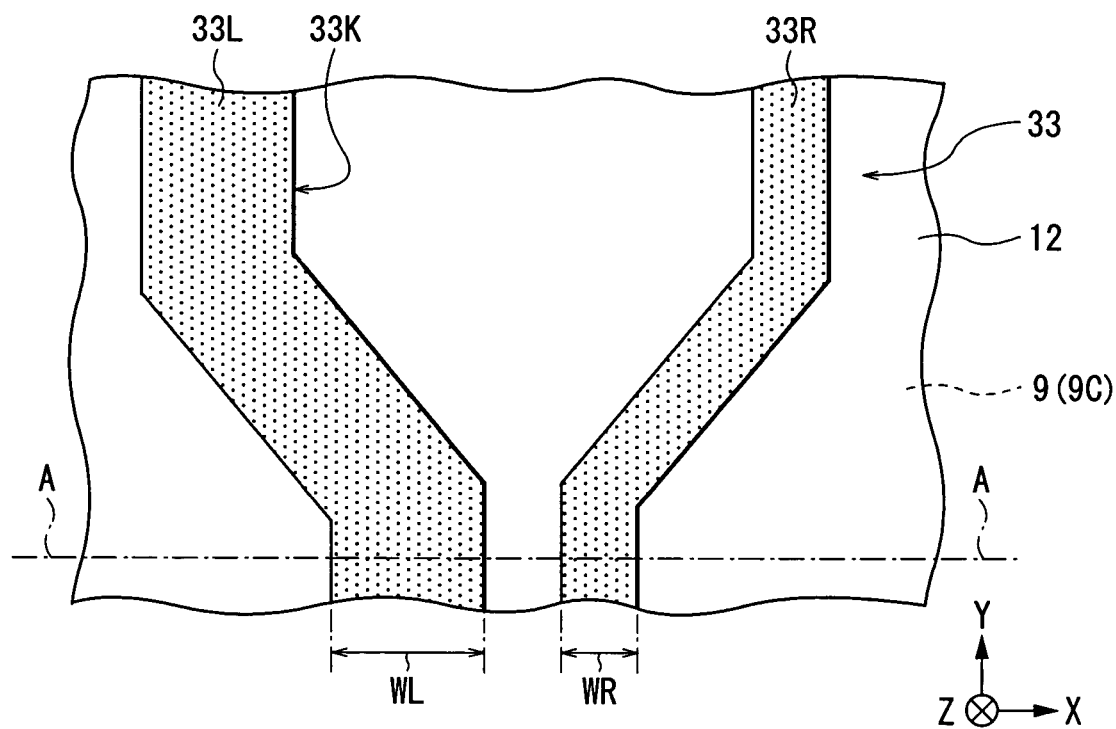
FIG. 15 is a plan view corresponding to FIG. 5.

Next, after the photoresist film 31 processed through photolithography is heated as necessary, the photoresist film 31 is developed, that is, an unnecessary portion (a portion not patterned) of the photoresist film 31 is selectively removed, thereby as shown in FIGS. 5 and 15, the photoresist pattern 33 for forming the pole portion layer 13A is formed on the seed layer 12 so as to have a thickness T1. The photoresist pattern 33 is formed so as to have a planar shape corresponding to the planar shape of the mask 32, that is, a pattern shape in which two frame portion 33R (a first frame portion) and 33L (a second frame portion) facing each other in the width direction and determining the aperture 33K, and the width WR of the frame portion 33R is smaller than the width WL of the frame portion 33L. As specific dimensions of the frame portions 33R and 33L, for example, the width WR of the frame portion 33R is 1.8 μm, and the width WL of the frame portion 33L is 7.5 μm. The structure of the photoresist pattern 33 (the width WR of the frame portion 33R and the width WL of the frame portion 33L) determines the base angles θR and θL (refer to FIG. 3) in the exposed surface 20M of the pole portion layer 13A formed in a later step. In other words, when the pole portion layer 13A is finally formed, in the width direction, the base angle θR is positioned corresponding to the frame portion 33R, and the base angle θL is positioned corresponding to the frame portion 33L, and the base angle θR is determined by the width WR of the frame portion 33R, and the base angle θL is determined by the width WL of the frame portion 33L. More specifically, for example, as described above, in the case where the pattern shape of the photoresist pattern 33 is set so that the width WR of the frame portion 33R is smaller than the width WL of the frame portion 33L, in the exposed surface 20M of the pole portion layer 13A finally formed, the base angle θR is larger than the base angle θL (θR>θL).

Figure 6:
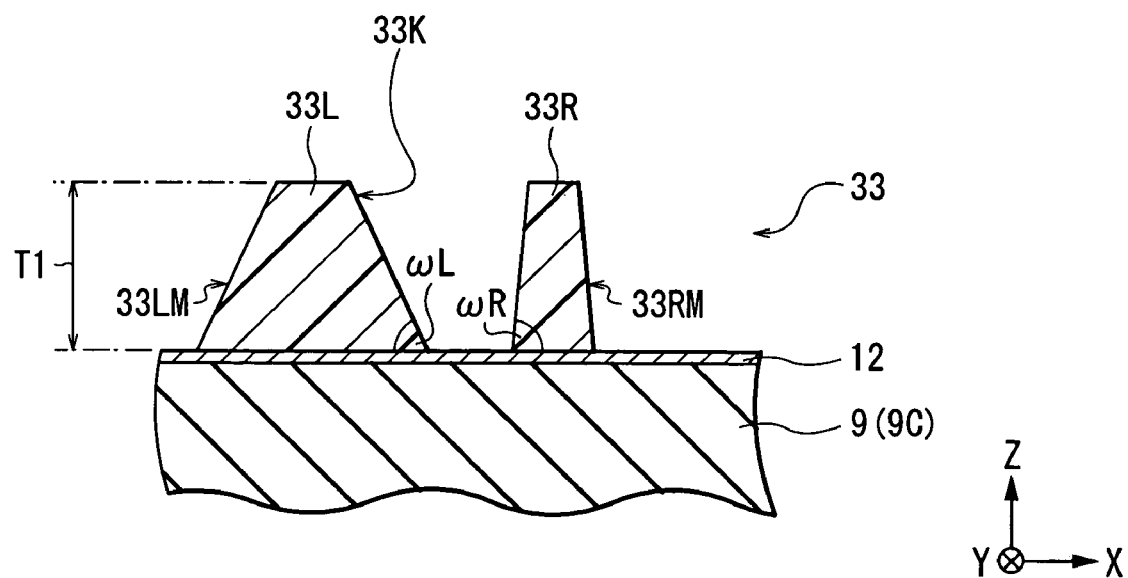
FIG. 6 is a sectional view for describing a step following the step of FIG. 5.
Figure 16:
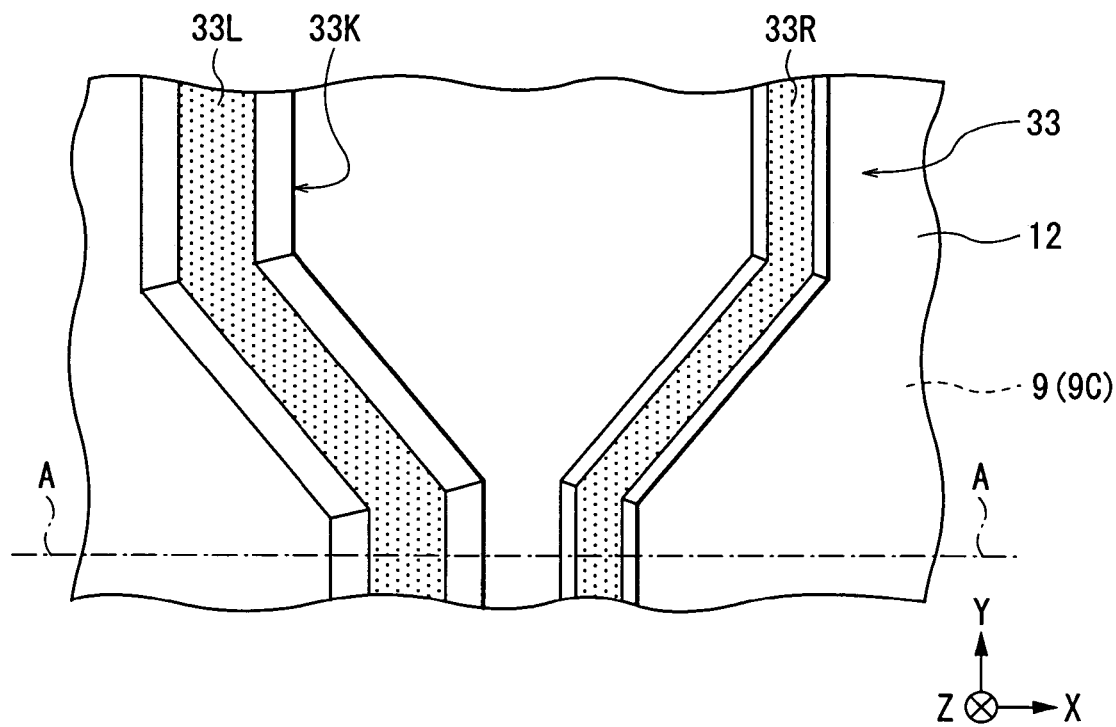
FIG. 16 is a plan view corresponding to FIG. 6.

Next, the photoresist pattern 33 is heated to partially flow a portion of the photoresist pattern 33 near the surface thereof, thereby as shown in FIGS. 6 and 16, the shapes of the frame portions 33R and 33L are changed so that the widths of the frame portions 33R and 33L are gradually increased toward the seed layer 12, that is, both side surfaces 33RM and 33LM of the frame portions 33R and 33L are inclined with respect to the surface of the seed layer 12. By the heating process, the width of the aperture 33K which has a substantially uniform width in a thickness direction (refer to FIGS. 5 and 15) is changed in the thickness direction according to a change in the widths of the frame portions 33R and 33L, that is, the width of the aperture 33K is gradually reduced toward the seed layer 12. At this time, a difference in fluidity of the frame portions 33R and 33L occurs on the basis of a difference between the widths WR and WL, that is, whereas the frame portion 33R with a relatively small width WR does not easily flow, the frame portion 33L with a relatively large width WL easily flows, so there is a difference between a tilt angle ωR of the side surface 33RM of the frame portion 33R and a tilt angle ωL of the side surface 33LM of the frame portion 33L occurs after heating, that is, the tilt angle ωR is larger than the tilt angle ωL (ωR>ω) L). The photoresist pattern 33 is heated, for example, in a nitrogen ($N_2$) atmosphere at a heating temperature of approximately 130° C. for a heating time of approximately 10 minutes. However, the heating temperature and the heating time are not limited to the above temperature and the above time, and can be freely set. More specifically, the heating temperature is preferably higher than the temperature of the photoresist pattern 33 (or the photoresist film 31) in a series of processes from a coating process to a developing process, and more specifically, the temperature is more preferably equal to or higher than the glass transition temperature of the photoresist of the photoresist pattern 33 (or the photoresist film 31). Moreover, the heating time is preferably equal to or longer than the time capable of stabilizing the temperature when the temperature is increased to the heating temperature. When the photoresist pattern 33 is heated, to be accurate, the surfaces of the frame portions 33R and 33L are curved by the surface tension of the photoresist; however, in FIG. 6 and FIG. 7 or later drawings, for the sake of simplification, the surfaces of the frame portions 33R and 33L are flat.

Figure 7:
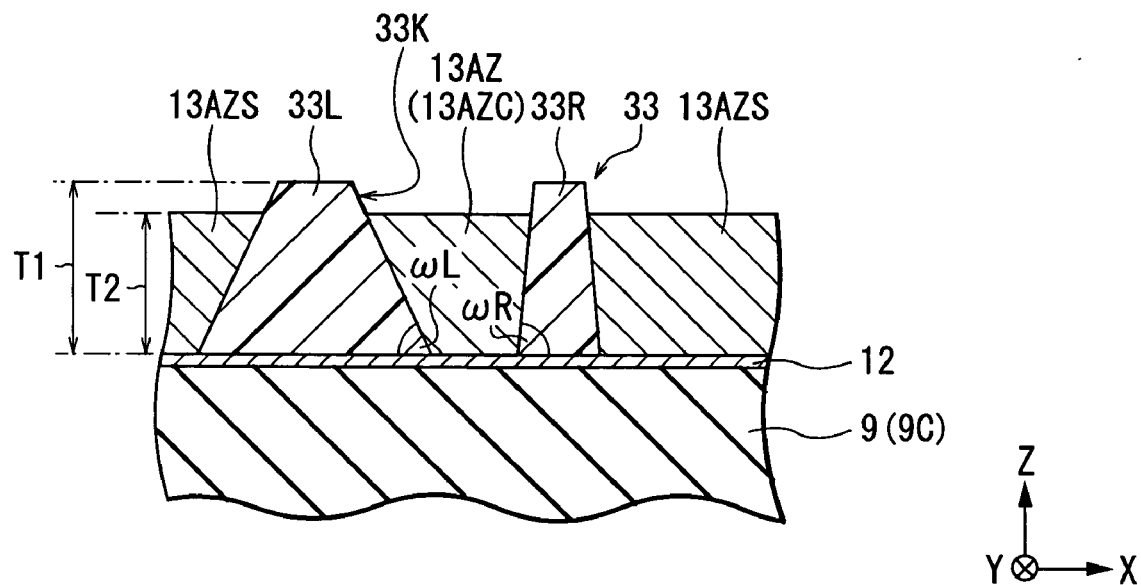
FIG. 7 is a sectional view for describing a step following the step of FIG. 6.
Figure 17:
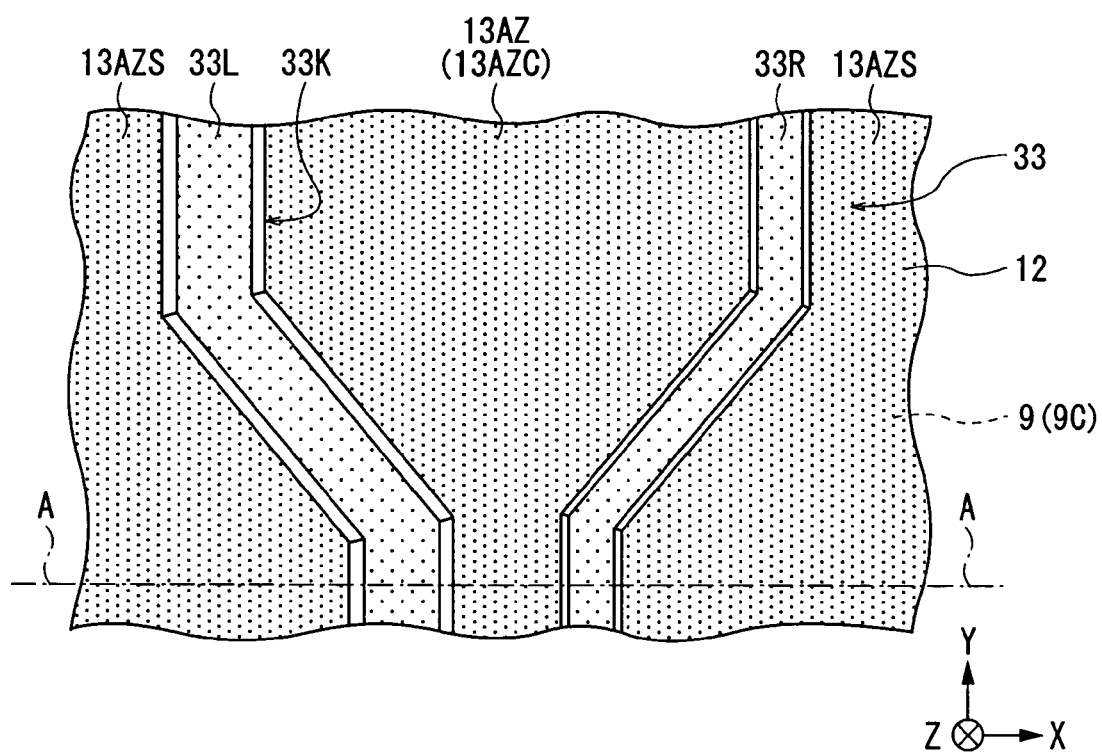
FIG. 17 is a plan view corresponding to FIG. 7.

Next, as shown in FIGS. 7 and 17, the precursor pole portion layer 13AZ (precursor pole portion) for forming the pole portion layer 13A is pattern-formed so that the aperture 33K of the photoresist pattern 33 and a peripheral area of the photoresist pattern 33 are coated with the precursor pole portion layer 13AZ. The precursor pole portion layer 13AZ is formed, for example, through using the seed layer 12 to grow a plating film. The precursor pole portion layer 13AZ is formed so as to include a portion (a center portion 13AZC as a magnetic layer pattern) formed in the aperture 33K of the photoresist pattern 33, and a portion (a peripheral portion 13AZS) formed in the peripheral area of the photoresist pattern 33. The precursor pole portion layer 13AZ is formed of, for example, a soft magnetic material such as Permalloy, a cobalt-iron alloy (CoFe) or a cobalt-iron-nickel alloy (CoFeNi), and the thickness T2 of the precursor pole portion layer 13AZ is adjusted to be smaller than the thickness T1 of the photoresist pattern 33 (T2<T1).

Figure 8:
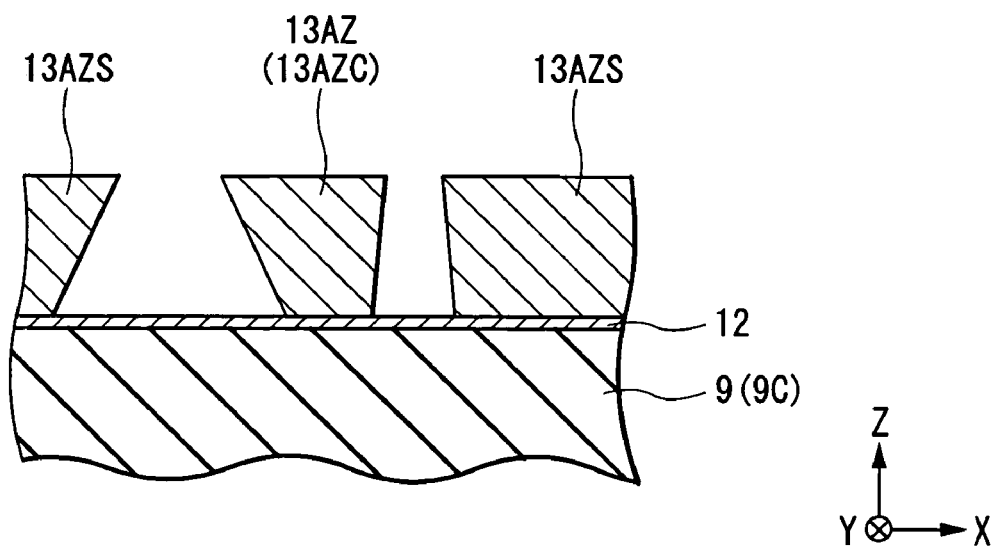
FIG. 8 is a sectional view for describing a step following the step of FIG. 7.
Figure 18:
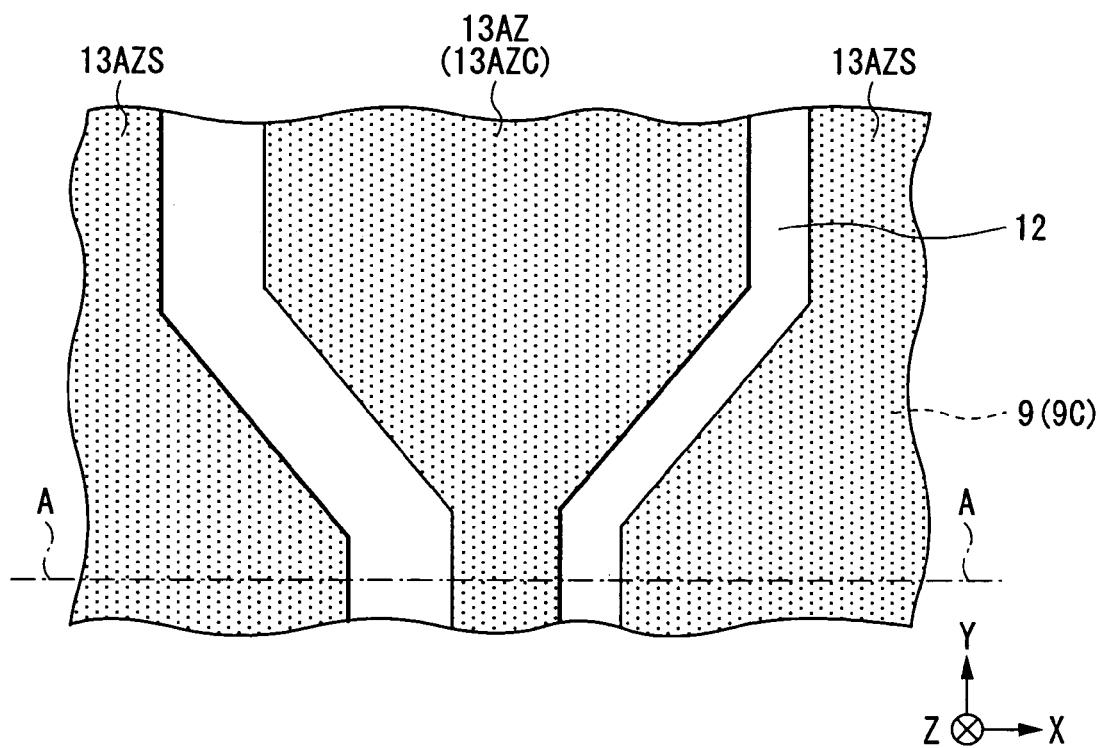
FIG. 18 is a plan view corresponding to FIG. 8.

Then, as shown in FIGS. 8 and 18, the photoresist pattern 33 is selectively removed, for example, through using an organic solvent such as acetone to dissolve the photoresist pattern 33.

Figure 9:
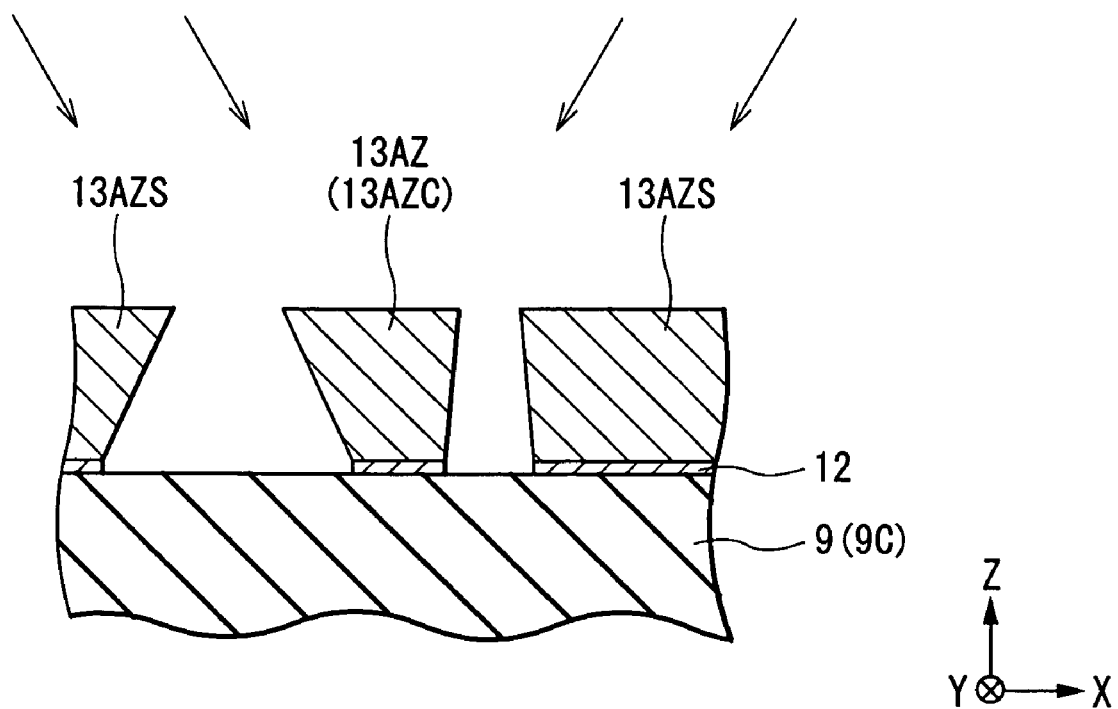
FIG. 9 is a sectional view for describing a step following the step of FIG. 8.
Figure 19:
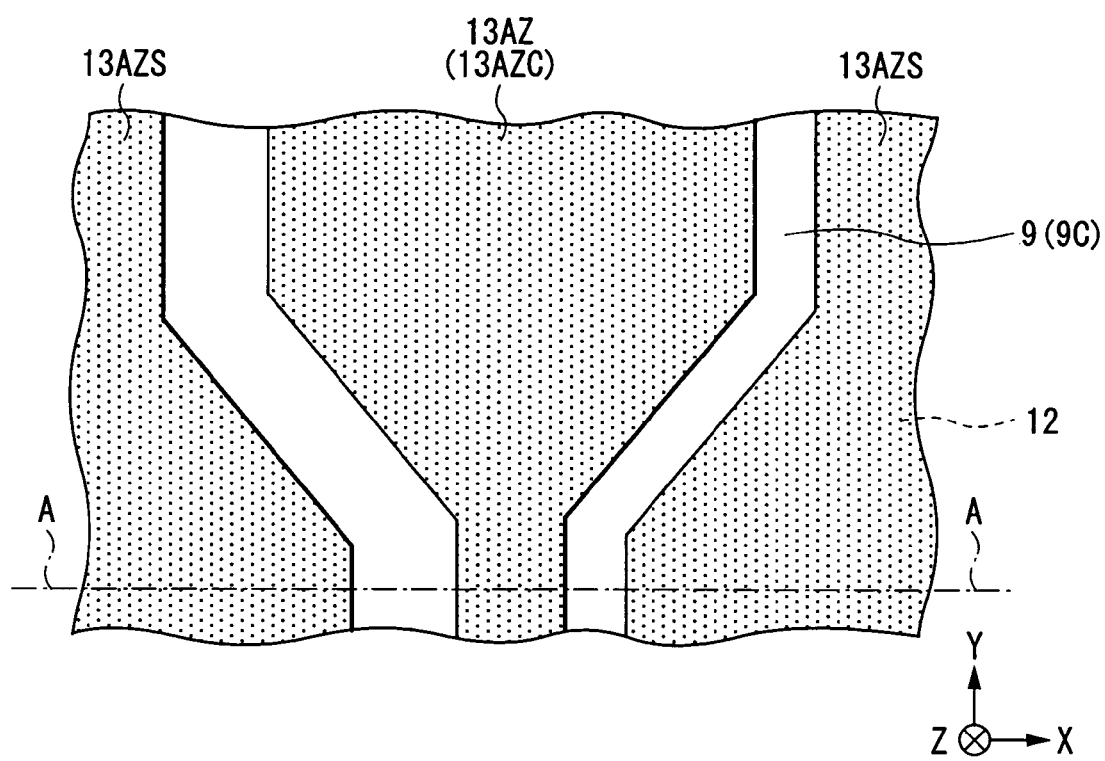
FIG. 19 is a plan view corresponding to FIG. 9.

Next, the seed layer 12 is selectively etched, for example, through ion milling by using the precursor pole portion layer 13AZ (the center portion 13AZC and the peripheral portion 13AZS) as a mask, thereby as shown in FIGS. 9 and 19, a portion of the seed layer 12 which is not coated with the precursor pole portion layer 13AZ is removed so as to expose the gap layer 9, and to leave a portion of the seed layer 12 which is coated with the precursor pole portion layer 13AZ. The seed layer 12 is etched through ion milling in, for example, an argon ion ($Ar^+$) atmosphere. Moreover, the seed layer 12 can be etched through wet etching instead of dry etching which is typified by the above ion milling.

Figure 10:
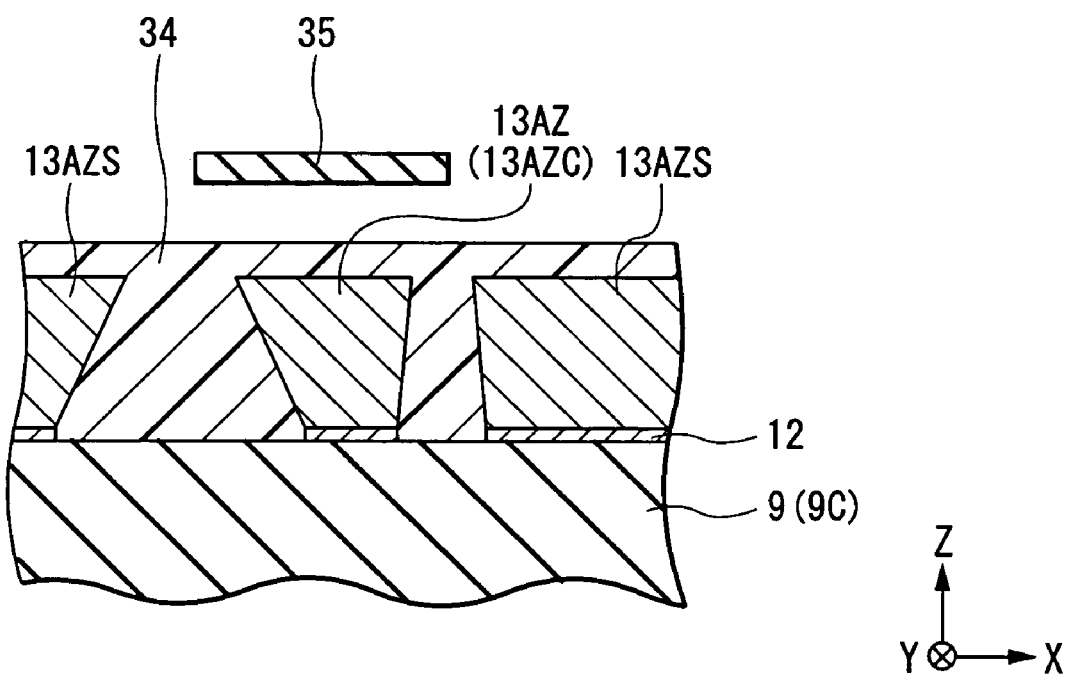
FIG. 10 is a sectional view for describing a step following the step of FIG. 9.
Figure 20:
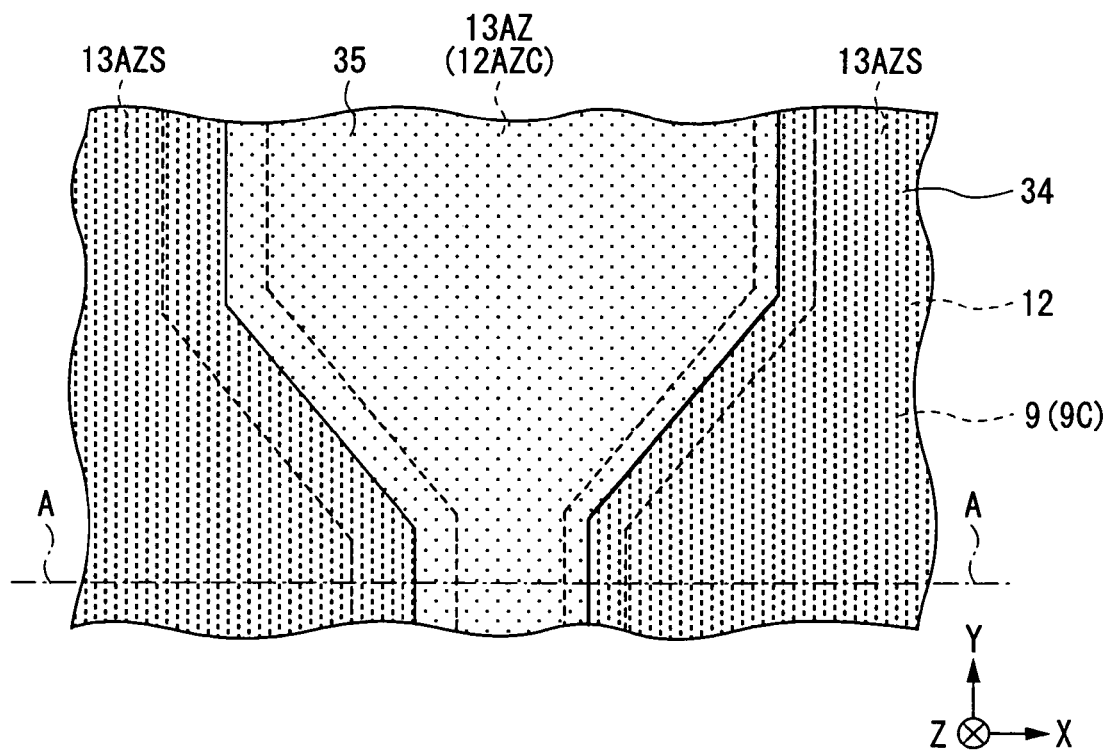
FIG. 20 is a plan view corresponding to FIG. 10.

Then, as shown in FIGS. 10 and 20, after the photoresist film 34 is formed so that the precursor pole portion layer 13AZ (the center portion 13AZC and the peripheral portion 13AZS) and its surroundings are coated with the photoresist film 34 through the same technique as in the case where the photoresist film 31 is formed in the former step, the mask 35 with a predetermined pattern shape is used to pattern the photoresist film 34 corresponding to the pattern shape of the mask 35 by photolithography. As the mask 35, for example, a mask with a planar shape corresponding to the center potion 13AZC of the precursor pole portion layer 13AZ is used, and more specifically, a mask with a larger outline than the outline of the center portion 12AZC is used.

Figure 11:
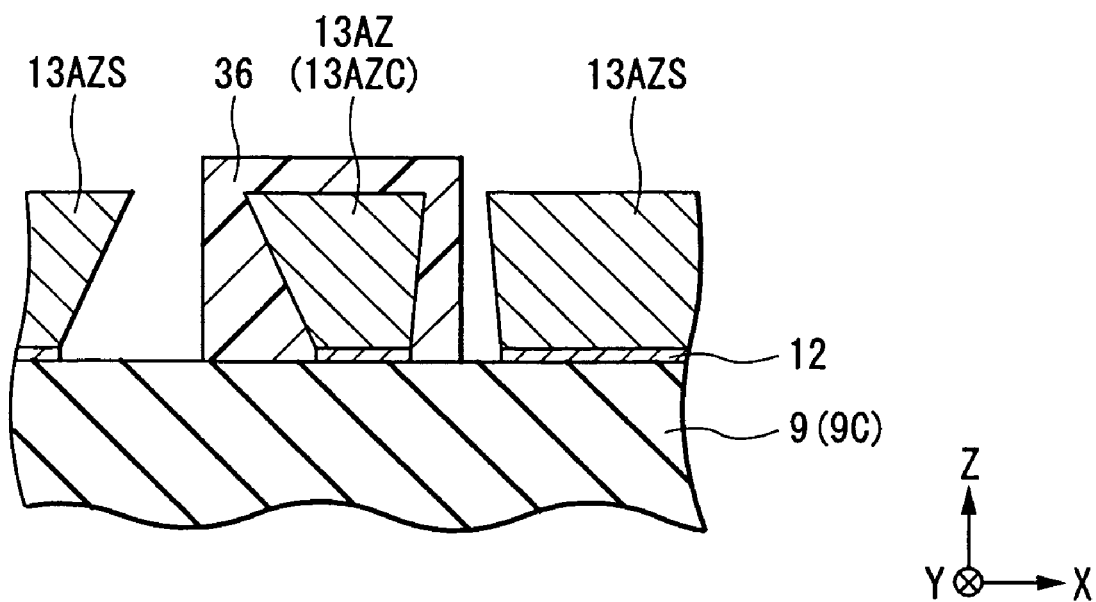
FIG. 11 is a sectional view for describing a step following the step of FIG. 10.
Figure 21:
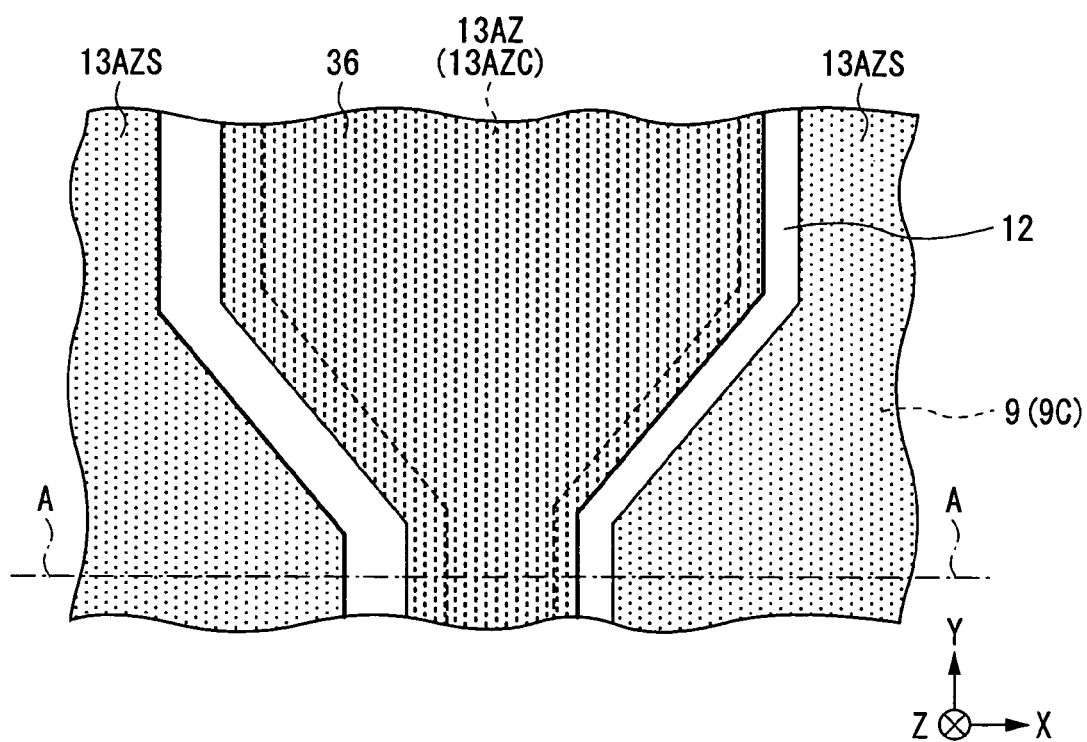
FIG. 21 is a plan view corresponding to FIG. 11.

Next, the photoresist film 34 processed through photolithography is developed, thereby as shown in FIGS. 11 and 21, the photoresist pattern 36 (mask) is formed so that only the center portion 13AZC of the precursor pole portion layer 13AZ is selectively coated with the photoresist pattern 36.

Figure 12:
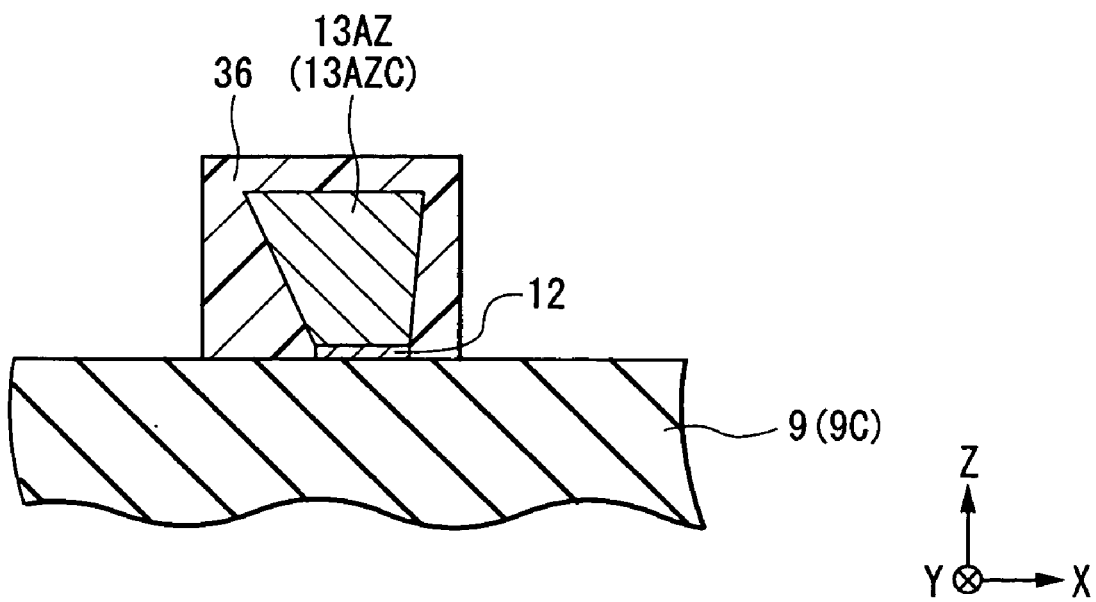
FIG. 12 is a sectional view for describing a step following the step of FIG. 11.
Figure 22:
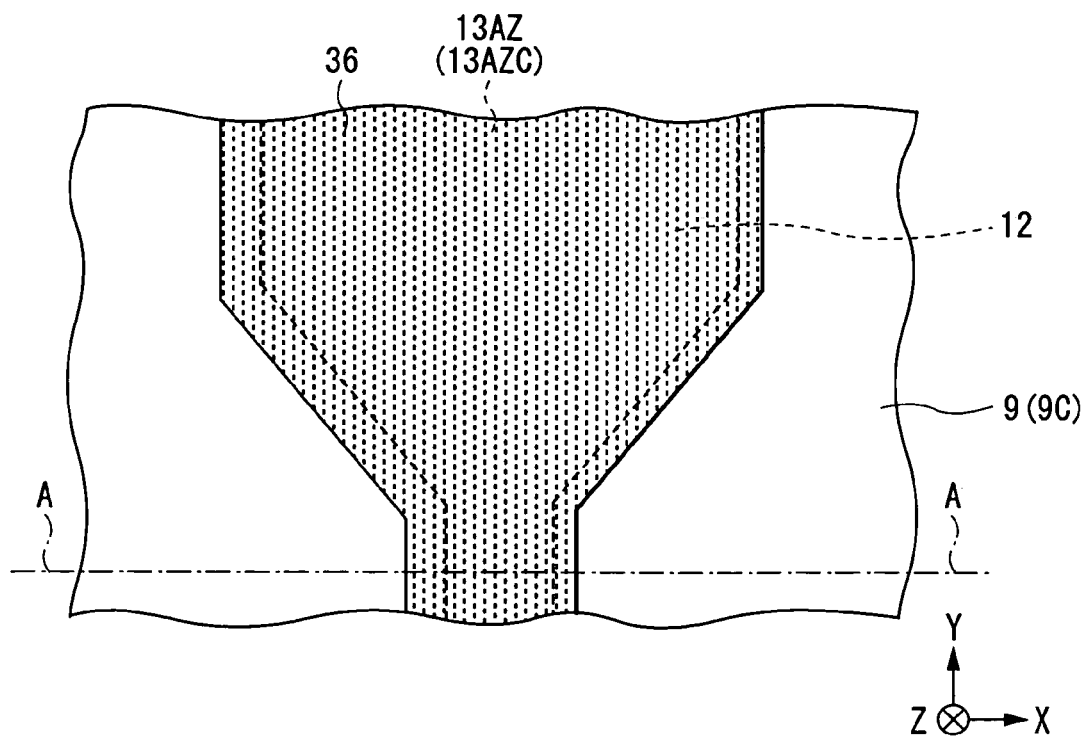
FIG. 22 is a plan view corresponding to FIG. 12.

Then, the precursor pole portion layer 13AZ is selectively etched through, for example, wet etching by using the photoresist pattern 36 as a mask, thereby as shown in FIGS. 12 and 22, a portion of the precursor pole portion layer 13A2 which is formed in the peripheral area of the photoresist pattern 33 in the former step (refer to FIG. 7), that is, the peripheral portion 13AZS which is not coated with the photoresist pattern 36 is removed, and only a portion which is formed in the aperture 33K of the photoresist pattern 33, that is, the center portion 13AZC which is coated with the photoresist pattern 36 is left. At this time, the seed layer 12 is selectively etched together with the precursor pole portion layer 13AZ so as to remove a portion of the seed layer 12 coated with the peripheral portion 13AZS. When the precursor pole portion layer 13AZ and the seed layer 12 are etched through wet etching, for example, a 50% solution of iron (II) chloride ($FeCl_2$) is used as an etchant.

Figure 13:
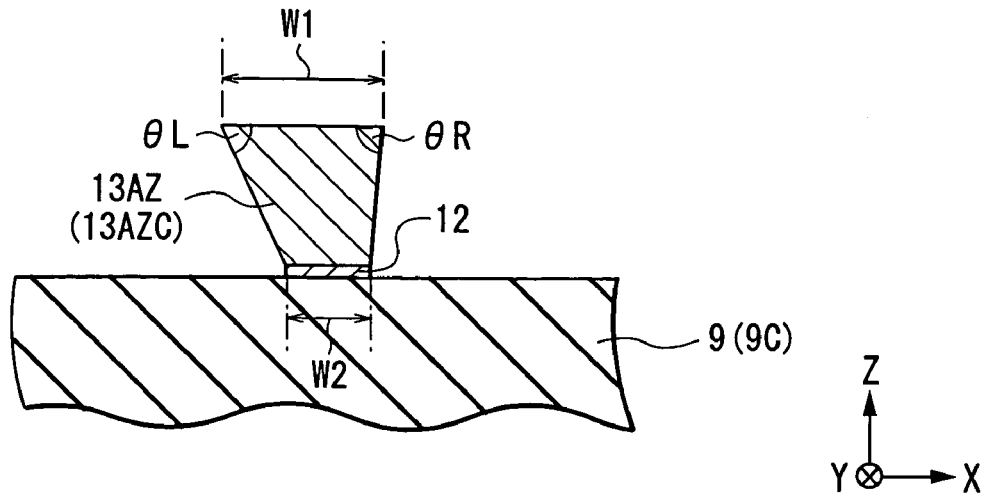
FIG. 13 is a sectional view for describing a step following the step of FIG. 12.
Figure 23:
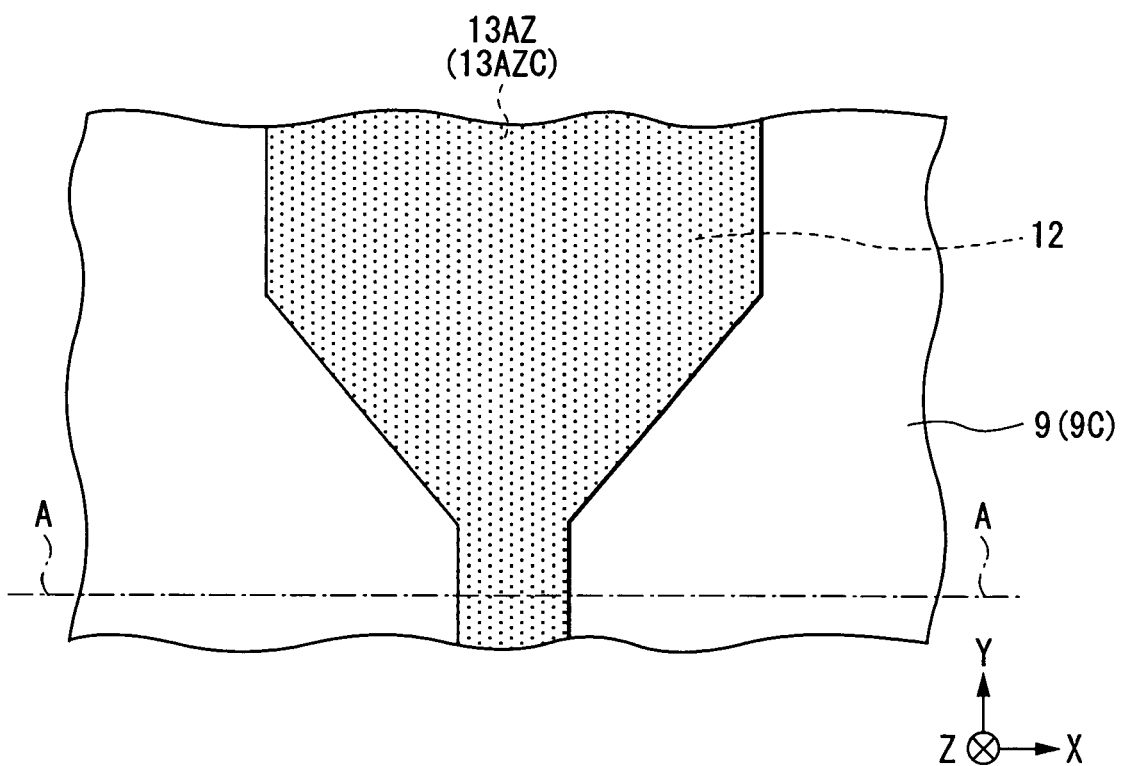
FIG. 23 is a plan view corresponding to FIG. 13.

Next, the photoresist pattern 36 is removed through the same technique as in the case where the photoresist pattern 33 is removed in the former step, thereby as shown in FIGS. 13 and 23, the precursor pole portion layer 13AZ (the center portion 13AZC) is exposed. On the basis of the shape of the precursor pole portion layer 13AZ (the center portion 13AZC), the shape (the widths W1 and W2 and the base angles θR and θL) of the exposed surface 20M of the pole portion layer 13A is finally determined.

Figure 24:
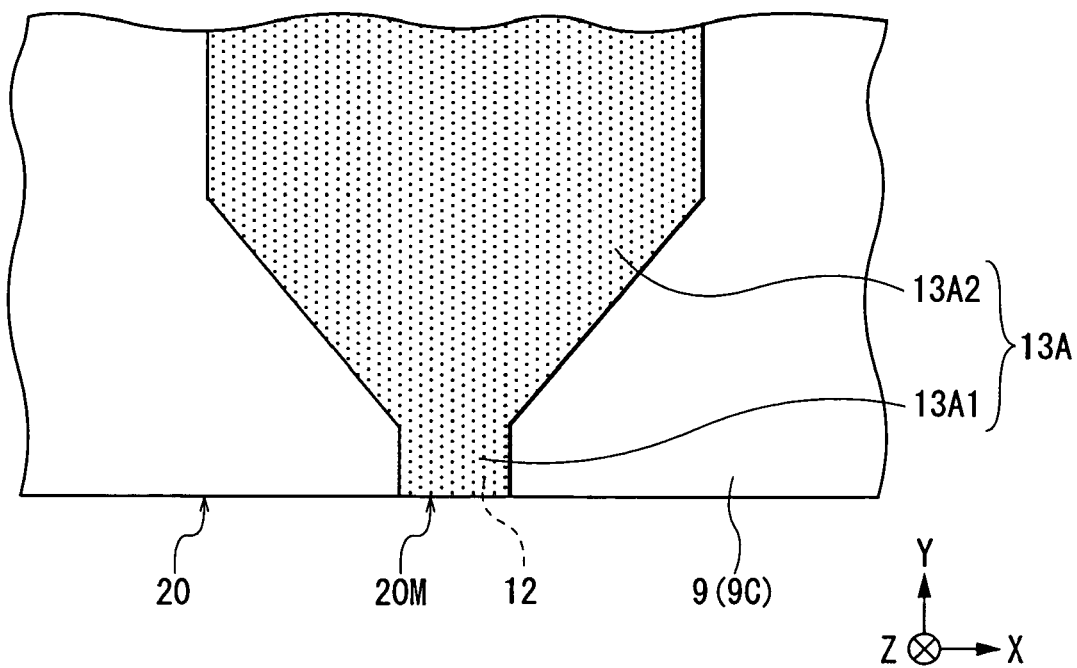
FIG. 24 is a plan view for describing a step following the step of FIG. 23.

Finally, after other components such as the yoke portion layer 13B and the overcoat layer 14 are formed and laminated, as shown in FIG. 24, a laminate end surface of the laminate structure including the precursor pole portion layer 13AZ (the center portion 13AZC) is polished from a side where the air bearing surface 20 is formed through, for example, CMP (Chemical Mechanical Polishing) so as to form the air bearing surface 20. The air bearing surface 20 is exposed through polishing, that is, the exposed surface 20M shown in FIG. 3 is formed so as to constitute a part of the air bearing surface 20, so as shown in FIGS. 1A, 1B, 2 and 3, the pole portion layer 13A having the exposed surface 20M with an asymmetrical inverted trapezoidal shape, and including the front end portion 13A1 and the rear end portion 13A2 in order from the air bearing surface 20 is completed. In the exposed surface 20M, for example, as described above, in the case where the width WR of the frame portion 33R in the photoresist pattern 33 is 1.8 μm and the width WL of the frame portion 33L in the photoresist pattern 33 is 7.5 μm (WR<WL; refer to FIGS. 5 and 15), the tilt angle ωR of the side surface 33RM of the frame portion 33R is larger than the tilt angle ωL of the side surface 33LM of the frame portion 33L (ωR>ωL; refer to FIG. 6), so a difference between the tilt angles ωR and ωL is reflected so that the base angle θR is larger than the base angle θL (for example, the base angle θR is 86° and the base angle θL is 76°).

In the method of manufacturing a thin film magnetic head according to the embodiment, the photoresist pattern 33 is formed so that two frame portions 33R and 33L which determine the aperture 33K have widths WR and WL different from each other (WR≠WL), and the photoresist pattern 33 is heated to deform the frame portions 33R and 33L, thereby the width of the aperture 33K is gradually reduced toward the seed layer 12, and then the precursor pole portion layer 13AZ (the center portion 13AZC) is formed in the aperture 33K of the photoresist pattern 33, and the precursor pole portion layer 13AZ (the center portion 13AZC) is polished to form the air bearing surface 20. Thereby, the pole portion layer 13A having the exposed surface 20M is formed. In this case, as described above, by using the deformation effect of the frame portions 33R and 33L by heating of the photoresist pattern 33, in the photoresist pattern 33 after heating, the tilt angle ωR of the frame portion 33R and the tile angle ωL of the frame portion 33L are different from each other, so when the pole portion layer 13A is formed on the basis of the precursor pole portion layer 13AZ formed in the aperture 33K of the photoresist pattern 33, in the exposed surface 20M of the pole portion layer 13A, a difference between the tilt angles ωR and ωL is reflected so that the base angles θR and θL are different from each other, that is, the pole portion layer 13A is formed so that the exposed surface 20M has an asymmetrical inverted trapezoidal shape. Therefore, in the embodiment, on the basis of the characteristic shape of the exposed surface 20M with an asymmetrical inverted trapezoidal shape, a thin film magnetic head capable of achieving compatibility between preventing the occurrence of side erasing and securing overwrite characteristics can be manufactured.

In the thin film magnetic head manufactured through the method of manufacturing a thin film magnetic head according to the embodiment, the reason why preventing the occurrence of side erasing and securing the overwrite characteristics are compatible is as follows.

Figure 25:
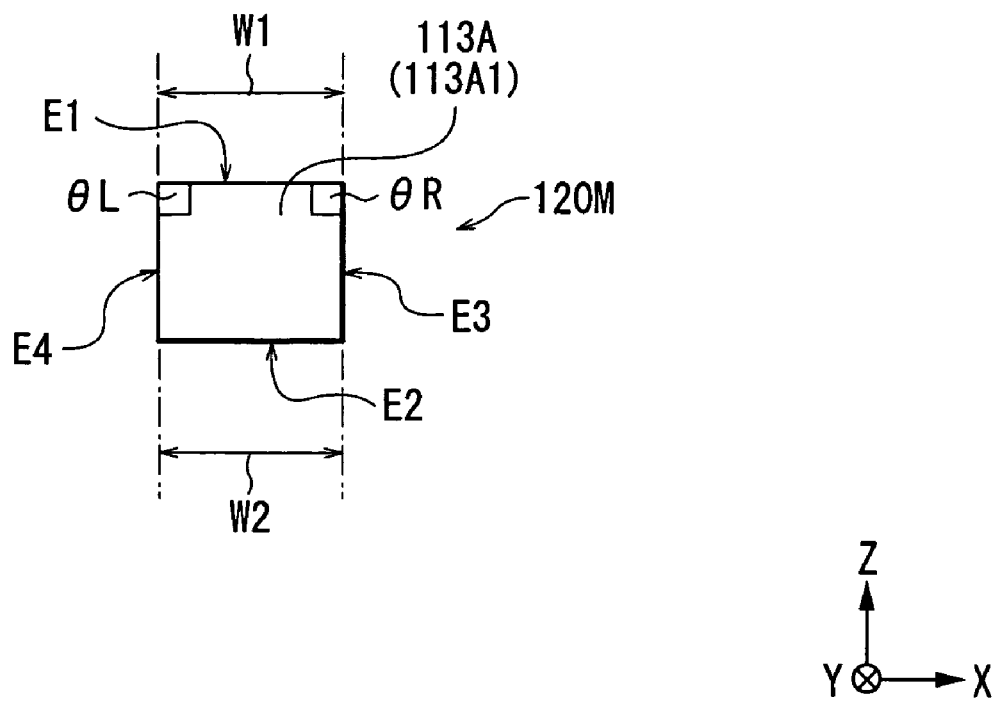
FIG. 25 is a plan view of an exposed surface of a pole portion layer of a first comparative example.
Figure 26:
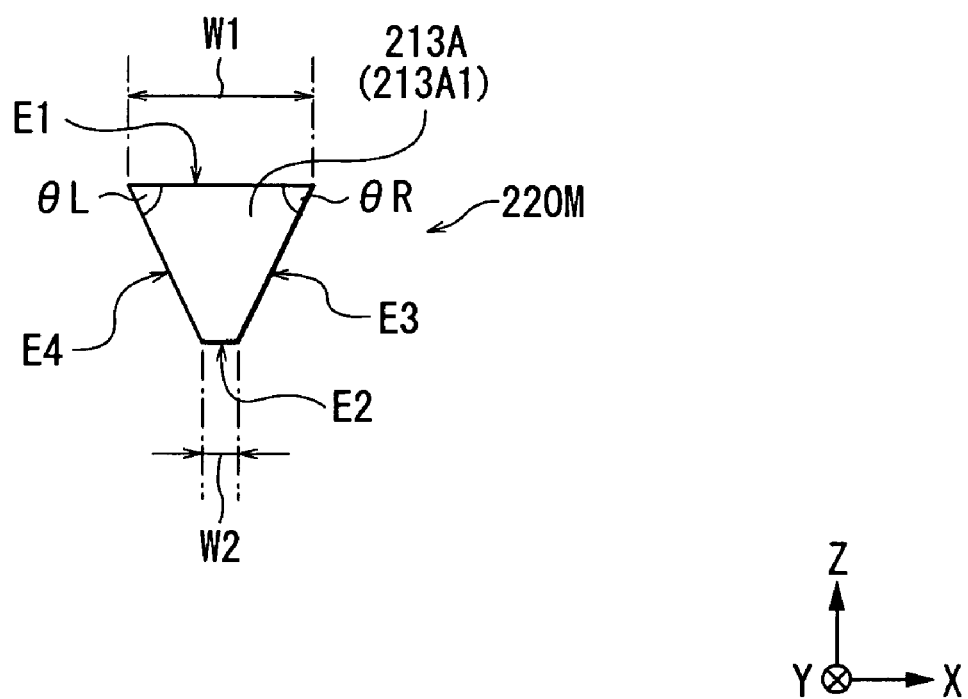
FIG. 26 is a plan view of an exposed surface of a pole portion layer of a second comparative example.
Figure 27:
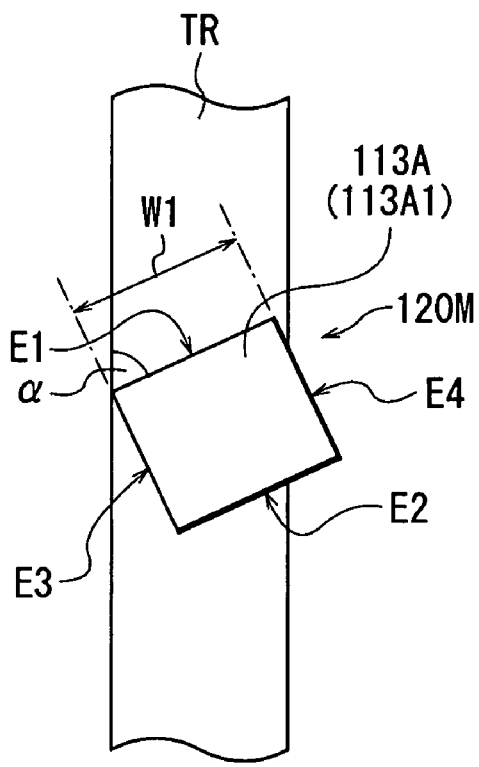
FIG. 27 is a plan view for describing the occurrence of side erasing relating to the pole portion layer of the first comparative example.
Figure 28:
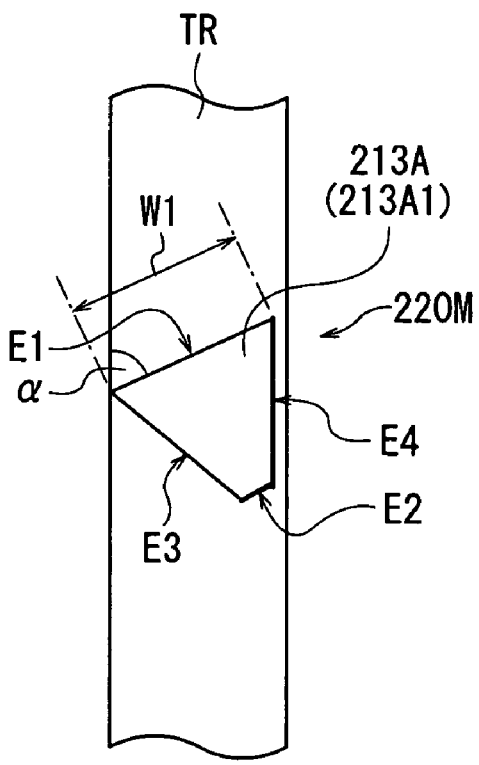
FIG. 28 is a plan view for describing the occurrence of side erasing relating to the pole portion layer of the second comparative example.
Figure 29:
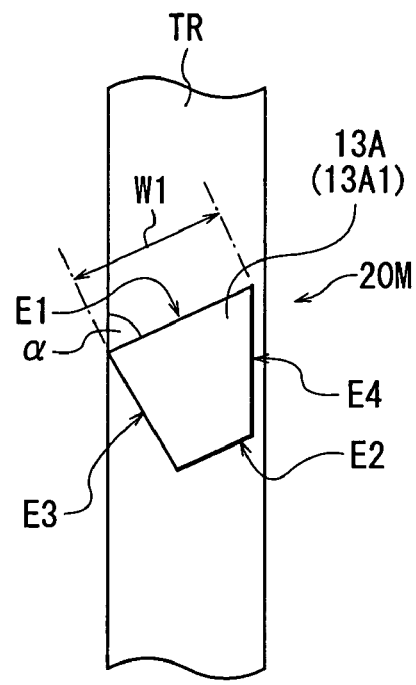
FIG. 29 is a plan view for describing the occurrence of side erasing relating to the pole portion layer according to an embodiment.

FIGS. 25 and 26 show plan views corresponding to the plan view of the exposed surface 20M of the pole portion layer 13A (the front end portion 13A1) shown in FIG. 3, and FIG. 25 shows an exposed surface 120M of a pole portion layer 113A (a front end portion 113A1) as a first comparative example, and FIG. 26 shows an exposed surface 220M of a pole portion layer 213A (a front end portion 213A1) as a second comparative example. Moreover, FIGS. 27 through 29 show illustrations for describing the occurrence of side erasing in the first comparative example (the exposed surface 120M), the second comparative example (the exposed surface 220M) and the embodiment (the exposed surface 20M), respectively. Further, in FIGS. 27 through 29, for the sake of simplification, a track (target track) TR to be recorded in recording information on a recording medium is shown as a straight line shape. The exposed surface 120M of the first comparative example shown in FIG. 25 has the same structure as the exposed surface 20M, except that unlike the exposed surface 20M of the embodiment with an asymmetrical inverted trapezoidal shape, the exposed surface 120M has a rectangular shape ($\theta R=\theta L=90°$). On the other hand, the exposed surface 220M of the second comparative example shown in FIG. 26 has the same structure as the exposed surface 20M, except that unlike the exposed surface 20M of the embodiment, the exposed surface 220M has a symmetrical inverted trapezoidal shape ($\theta R=\theta L$).

As shown in FIGS. 27 through 29, in recording information, when the thin film magnetic head is skewed, that is, the pole portion layers 13A, 113A and 213A are inclined at an angle (skew angle) $\alpha$ toward the extending direction of the target track TR, a difference in the occurrence of side erasing between three pole portion layers 13A, 113A and 213A occurs. More specifically, in the first comparative example, as shown in FIG. 27, when the pole portion layer 113A is inclined, due to the shape of the exposed surface 120M with a rectangular shape, the side edge E4 lies off the target track TR to a track adjacent to the target track TR (adjacent track; not shown), thereby a recording process is performed on the recording medium by not only the top edge E1 (trailing edge) which is an original recording point but also the side edge E4 without intention, so side erasing occurs. Thereby, information which has been already recorded on the adjacent track is overwritten, thereby the information is easily erased. On the other hand, in the case of the second comparative example, as shown in FIG. 28, unlike the case of the first comparative example, even if the pole portion layer 213A is inclined at the skew angle $\alpha$, on the basis of the characteristic shape of the exposed surface 220M with a symmetrical inverted trapezoidal shape, the side edge E4 does not lie off the target track TR to the adjacent track, that is, a recording process is performed on the recording medium by only the top edge E1 which is the original recording point, so the occurrence of side erasing can be prevented. Moreover, in the embodiment, as shown in FIG. 29, even if the pole portion layer 13A is inclined at the skew angle $\alpha$, on the basis of the characteristic shape of the exposed surface 20M with an asymmetrical inverted trapezoidal shape, the side edge E4 does not lie off the target track TR to the adjacent track, so as in the case of the second comparative example, the occurrence of side erasing can be prevented. Therefore, unlike the first comparative example, the second comparative example and the embodiment have an advantage in terms of preventing the occurrence of side erasing.

Although the second comparative example and the embodiment have a common advantage in terms of preventing the occurrence of side erasing, they are different in terms of securing the overwrite characteristics. More specifically, in general, as a relationship between the structure of the pole portion layer and the intensity of a magnetic field for recording, the exposed surface of the front end portion which is a portion where a magnetic flux is emitted functions as a magnetic flux outlet, so the amount of emission of the magnetic flux is dependent on the area of the exposed surface, and the larger the area of the exposed surface is, the larger the intensity of the magnetic field for recording becomes. When the second comparative example and the embodiment are compared in this point of view, as is evident from FIGS. 28 and 29, the area of the exposed surface 20M is larger than the area of the exposed surface 220M, so the intensity of the magnetic field for recording in the embodiment is larger than that in the second comparative example. In other words, in the second comparative example, while the occurrence of side erasing can be prevented, overwriting (an intended overwriting process) may not be able to perform due to lack of the intensity of the magnetic field for recording. On the other hand, in the embodiment, while the occurrence of side erasing can be prevented, the intensity of the magnetic field for recording can be secured to stably perform the overwriting process. Therefore, in the thin film magnetic head manufactured through the method of manufacturing a thin film magnetic head according to the embodiment, on the basis of the characteristic shape of the exposed surface 20M with an asymmetrical inverted trapezoidal shape, preventing the occurrence of side erasing and securing the overwrite characteristics are compatible.

Moreover, in the embodiment, as described above, in addition to being able to manufacture the thin film magnetic head capable of achieving compatibility between preventing the occurrence of side erasing and securing the overwrite characteristics, the pole portion layer 13A is formed so that the exposed surface 20M has an asymmetrical inverted trapezoidal shape, so only existing thin film processes such as film formation techniques, patterning techniques and etching techniques are used. Therefore, the thin film magnetic head can be easily manufactured through the existing manufacturing processes.

Moreover, in the embodiment, the width WR of the frame portion 33R and the width WL of the frame portion 33L in the photoresist pattern 33 are set, thereby as described above, the tilt angle $\omega R$ of the frame portion 33R and the tilt angle $\omega L$ of the frame portion 33L are set on the basis of the widths WR and WL, and finally the base angles $\theta R$ and $\theta L$ in the exposed surface 20M of the pole portion layer 13A are set on the basis of the tilt angles $\omega R$ and $\omega L$. Therefore, in the case where the photoresist pattern 33 is formed, the width WR of the frame portion 33R and the width WL of the frame portion 33L are adjusted so as to be able to control the base angles $\theta R$ and $\theta L$, so the shape of the exposed surface 20M can be freely controlled.

Figure 30:
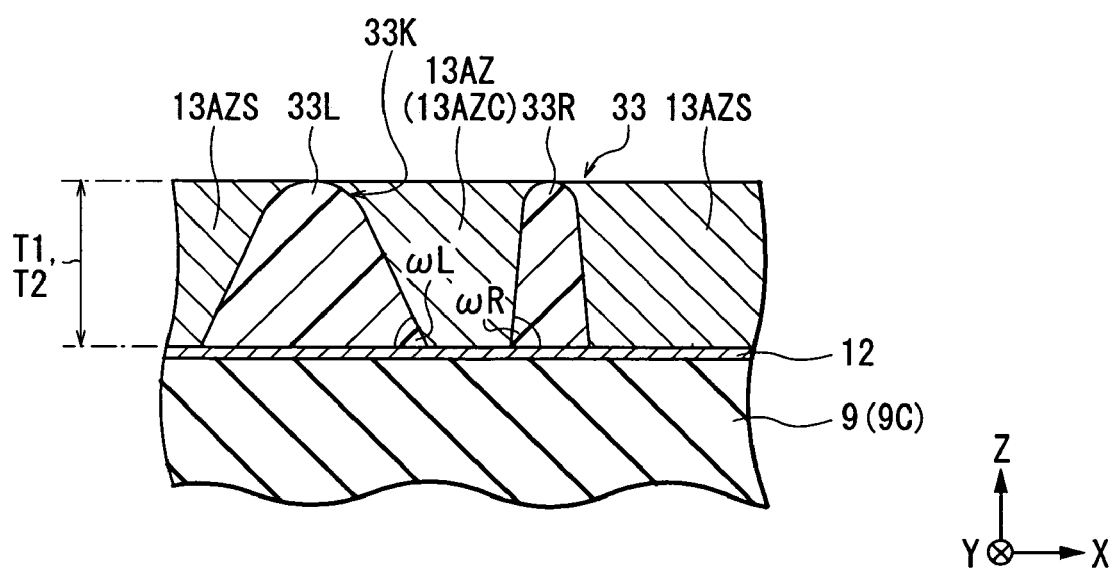
FIG. 30 is a sectional view for describing a problem relating to the thickness of a precursor pole portion layer.
Figure 31:
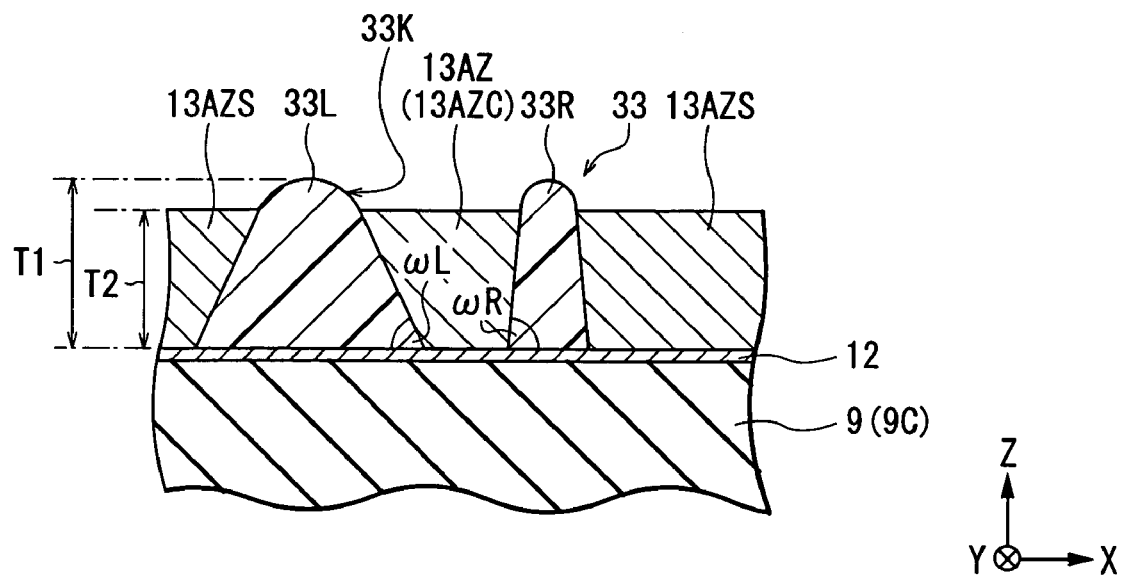
FIG. 31 is a sectional view for describing an advantage relating to the thickness of the precursor pole portion layer.

Moreover, in the embodiment, as shown in FIG. 7, in the case where the precursor pole portion layer 13AZ (the center portion 13AZC) is formed in the aperture 33K of the photoresist pattern 33, the thickness T2 is smaller than the thickness T1 of the photoresist pattern 33 (T2<T1), so the pole portion layer 13A can be formed on the basis of the precursor pole layer 13AZ (the center potion 13AZC) with high precision because of the following reason. FIGS. 30 and 31 show illustrations for describing an advantage and a problem on the basis of the thickness T2 of the precursor pole portion layer 13AZ, and FIGS. 30 and 31 show sectional views corresponding to FIG. 7. More specifically, in the case where the photoresist pattern 33 is heated to deform the frame portions 33R and 33L, as described above, in FIG. 7, for the sake of simplification, the side surfaces 33RM of the frame portion 33R and 33LM of the frame portion 33L are flat; however, as shown in FIGS. 30 and 31, it is known that the side surfaces 33RM and 33LM are actually curved due to the surface tension of the photoresist. More specifically, the curvatures of the side surfaces 33RM and 33LM are larger in the top portions of the frame portions 33R and 33L than the bottom portions thereof, that is, while the side surfaces 33RM and 33LM are substantially flat in the bottom portions of the frame portions 33R and 33L, the side surfaces 33RM and 33LM are curved in the top portions thereof. In this case, as shown in FIG. 30, when the precursor pole portion layer 13AZ is formed so that the thickness T2 is equal to the thickness T1 of the photoresist pattern 33 (T2=T1), in the exposed surface 20M (refer to FIG. 3) of the pole portion layer 13A which is finally formed, the top portions with a curved surface in the side surfaces 33RM and 33LM of the frame portions 33R and 33L cause a deviation between the tilt angles ωR and ωL and the base angles θR and θL, so it is difficult to control the base angles θR and θL with high precision. On the other hand, as shown in FIG. 31, when the thickness T2 of the precursor pole portion layer 13AZ is smaller than the thickness T1 of the photoresist pattern 33 (T2<T1), the bottom portions with a flat surface of the side surfaces 33RM and 33LM of the frame portions 33R and 33L are used to form the precursor pole portion layer 13AZ, so in the exposed surface 20M of the pole portion layer 13A which is finally formed, unlike the case where the thickness T2 of the precursor pole portion layer 13AZ is equal to the thickness T1 of the photoresist pattern 33 (refer to FIG. 30), the base angles θR and θL are determined on the basis of the tilt angles ωR and ωL, thereby the base angles θR and θL can be controlled with high precision. Therefore, in the embodiment, the pole portion layer 13A can be formed with high precision on the basis of the precursor pole portion layer 13AZ.

Moreover, in the method of forming a magnetic layer pattern according to the embodiment, as described above, the photoresist pattern 33 is formed so that two frame portions 33R and 33L determining the aperture 33K have a different width from each other, and then the photoresist pattern 33 is heated to deform the frame portions 33R and 33L, thereby the width of the aperture 33K is gradually reduced toward the bottom. After that, the pole portion layer 13A as a magnetic layer pattern is formed by using the aperture 33K of the photoresist pattern 33. Thus, the pole portion layer 13A as the magnetic layer pattern can be formed through the existing manufacturing processes so that the exposed surface 20M has an asymmetrical inverted trapezoidal shape. Therefore, as described above, the method of forming a magnetic layer pattern can be applied to the method of manufacturing a thin film magnetic head according to the invention.

Figure 32:
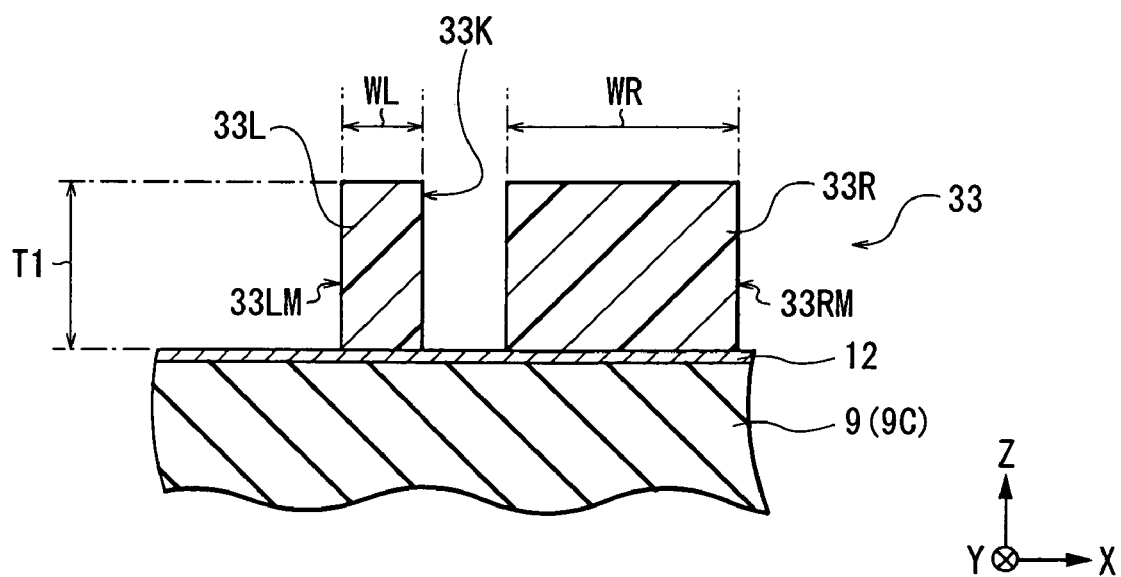
FIG. 32 is a sectional view for describing a modification of the method of manufacturing a thin film magnetic head according to the embodiment of the invention.
Figure 33:
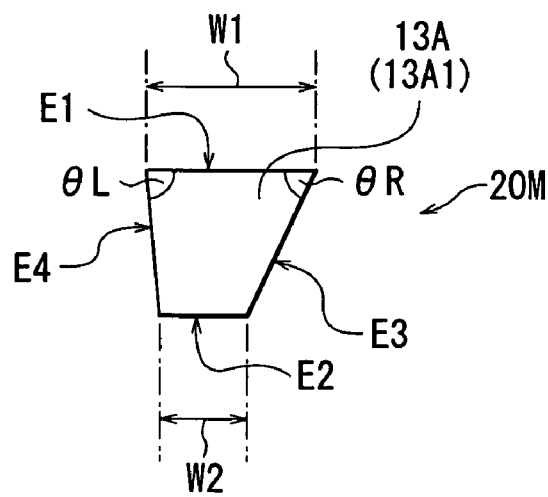
FIG. 33 is a plan view of an exposed surface of a pole portion layer formed by using a photoresist pattern shown in FIG. 32.
Figure 33:
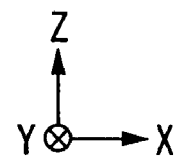

In the embodiment, as shown in FIG. 5, the photoresist pattern 33 is formed so that the width WR of the frame portion 33R is smaller than the width WL of the frame portion 33L (WR<WL), thereby as shown in FIG. 3, in the exposed surface 20M of the pole portion layer 13A, the base angle θR is larger than the base angle θL (θR>θL); however, it is not specifically limited to this. For example, as shown in FIG. 32, the width WR of the frame portion 33R may be larger than the width WL of the frame portion 33L (WR WL), thereby as shown in FIG. 33, in the exposed surface 20M, the base angle θR may be smaller than the base angle θL (θR<θL). Even in this case, the same effects as those in the embodiment can be obtained. Specifically, the base angles θR and θL and the magnitude relation between them can be freely set depending upon, for example, the skew angle α, the skew direction of the thin film magnetic head, the occurrence of side erasing or the like.

Moreover, in the embodiment, when the photoresist pattern 33 is formed, as the material of the photoresist pattern 33, a chemical amplification photoresist may be used, and in the case where the photoresist pattern is heated, while heating the photoresist pattern 33, ultraviolet rays may be applied to the photoresist pattern 33 so as to deform the frame portions 33R and 33L. The "chemical amplification photoresist" is a resist in which a material (an acid or a base) having catalysis is produced by using a photoreaction through exposing the resist mainly in a exposing-developing process in photolithography, and a functional group or a functional material in a macromolecule reacts with the above material having catalysis through heating the resist after the exposure. In this case, for example, a heating process and an ultraviolet irradiation process on the photoresist pattern 33 is performed in a vacuum at a heating temperature of approximately 100° C. for a heating time of approximately 10 minutes with a wavelength of ultraviolet rays of approximately 200 nm to 500 nm (for example, approximately 365 nm) and an intensity of ultraviolet irradiation of approximately 1 W/cm$^2$ to 15 W/cm$^2$ (for example, approximately 10 W/cm$^2$). However, the heating temperature and the heating time are not necessarily limited to the above temperature and the above time, and can be freely set. More specifically, for example, the heating temperature is preferably higher than the temperature of the photoresist pattern 33 (or the photoresist film 31) in a series of processes from a coating process to a developing process, and more preferably the heating temperature is equal to or higher than the glass transition temperature of the photoresist of which the photoresist pattern 33 (or the photoresist film 31) is made. Moreover, the heating time is preferably equal to or longer than, for example, a time capable of stabilizing the temperature when the temperature is increased to the heating temperature. As an example of this case, when the photoresist pattern 33 is formed, the width WR of the frame portion 33R is 3.0 μm, and the width WL of the frame portion 33L is 10.0 μm, as in the case described in the embodiment, in the exposed surface 20M, the base angle θR is 86° and the base angle θL is 76°. Even in this case, the same effects as those in the embodiment can be obtained. Specifically in the case where the photoresist pattern 33 is formed of the chemical amplification photoresist, the photoresist pattern 33 can be formed with high precision by using superior patterning precision characteristics of the chemical amplification photoresist.

Moreover, in the embodiment, the precursor pole portion layer 13AZ (the center portion 13AZC) shown in FIG. 13 is used as-is to form the pole portion layer 13A. In other words, the dimensions (the widths W1 and W2) of the pole portion layer 13A are determined on the basis of the dimensions (the widths W1 and W2) of the precursor pole portion layer 13AZ. However, the embodiment is not specifically limited to this.

Figure 34:
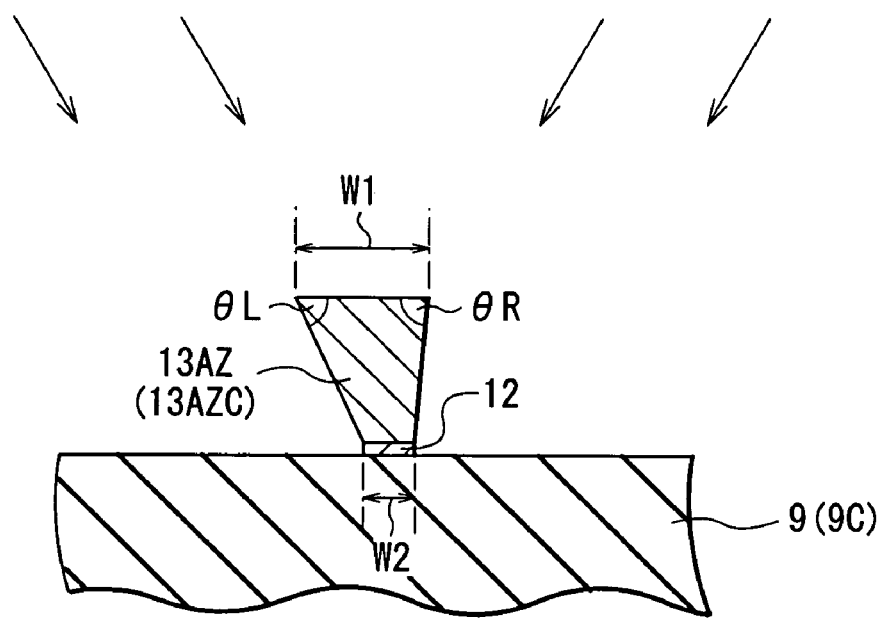
FIG. 34 is a sectional view for describing another modification of the method of manufacturing a thin film magnetic head according to the embodiment of the invention.
Figure 34:
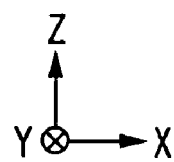

More specifically, firstly, for example, as shown in FIG. 34, after the precursor pole portion layer 13AZ (the center portion 13AZC) is formed, the center portion 13AZC is uniformly etched from both width directions through, for example, ion milling so as to reduce the width of the center portion 13AZC, thereby on the basis of the dimensions (the widths W1 and W2) of the center portion 13AZC after etching, the dimensions (the width W1 and W2) of the pole portion layer 13A may be determined. When the center portion 13AZC is etched through ion milling, the etching process is performed in, for example, an argon ion atmosphere. Even in this case, the same effects as those in the embodiment can be obtained. In this case, specifically on the basis of the etching amount of the center portion 13AZC, the shape of the exposed surface 20M can be controlled, so the width W1 (refer to FIG. 3) of the top edge E1 (trailing edge) of the exposed surface 20M determining the recording track width of the recording medium can be controlled so as to have a desired width.

Figure 35:
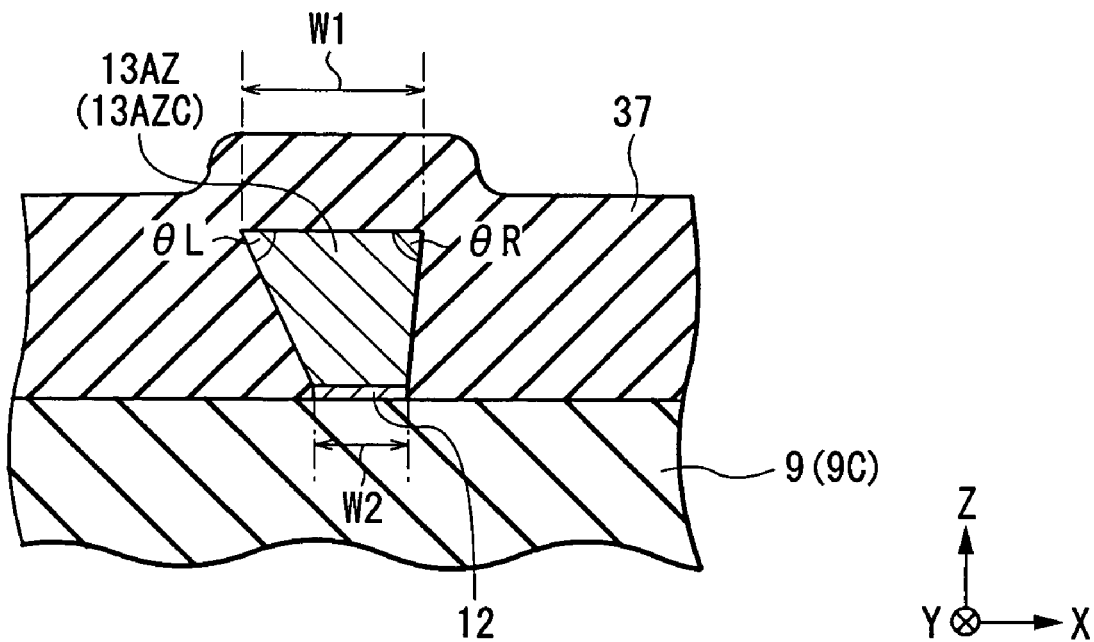
FIG. 35 is a sectional view for describing still another modification of the method of manufacturing a thin film magnetic head according to the embodiment of the invention.
Figure 36:
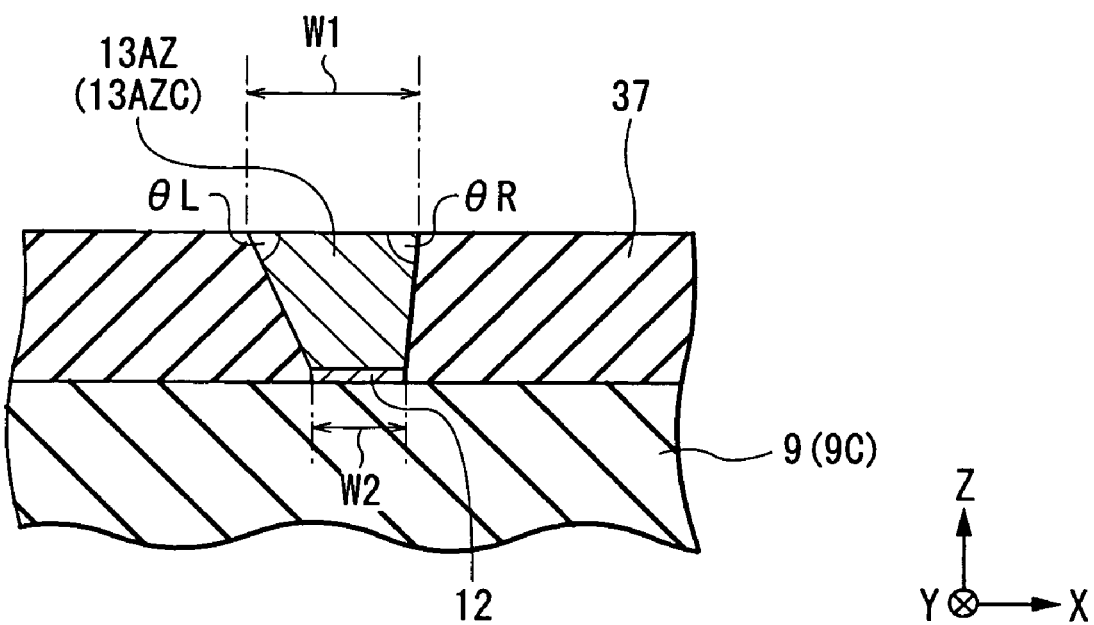
FIG. 36 is a sectional view for describing a step following a step of FIG. 35.
Figure 37:
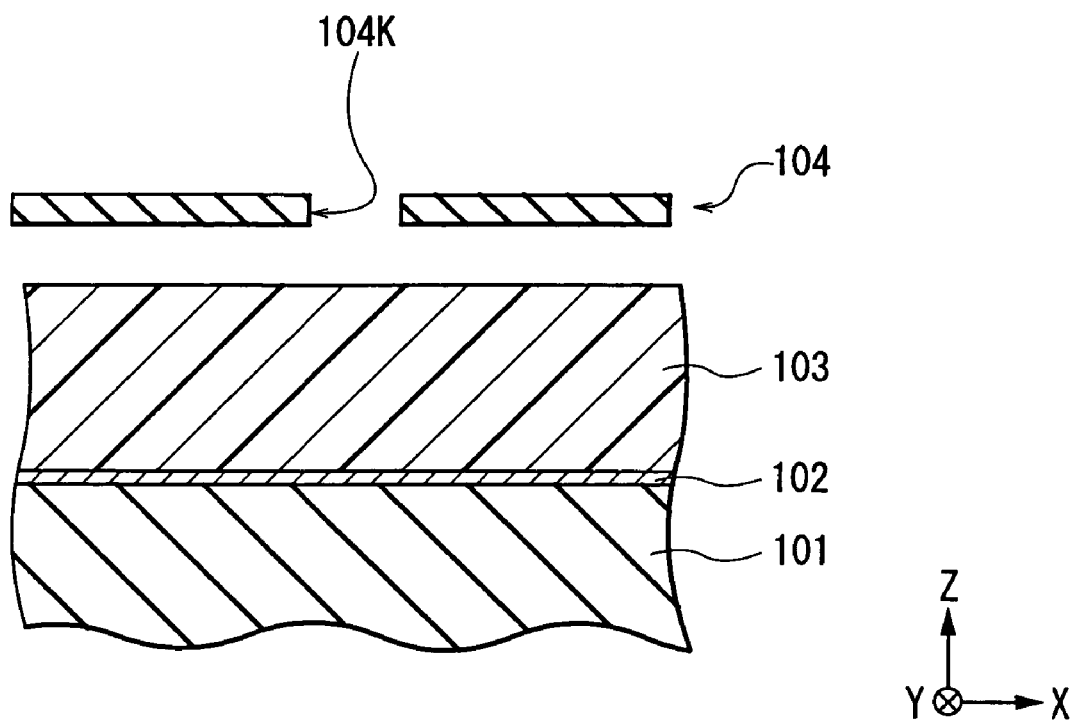
FIG. 37 is a sectional view for describing a step in a conventional method of forming a pole layer.
Figure 38:
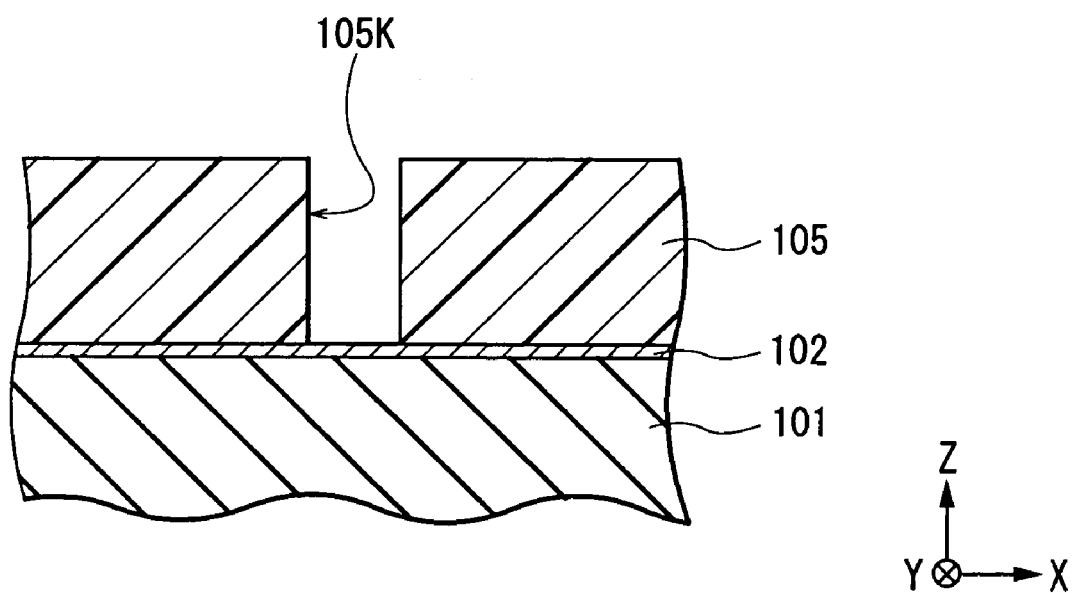
FIG. 38 is a sectional view for describing a step following the step of FIG. 37.
Figure 39:
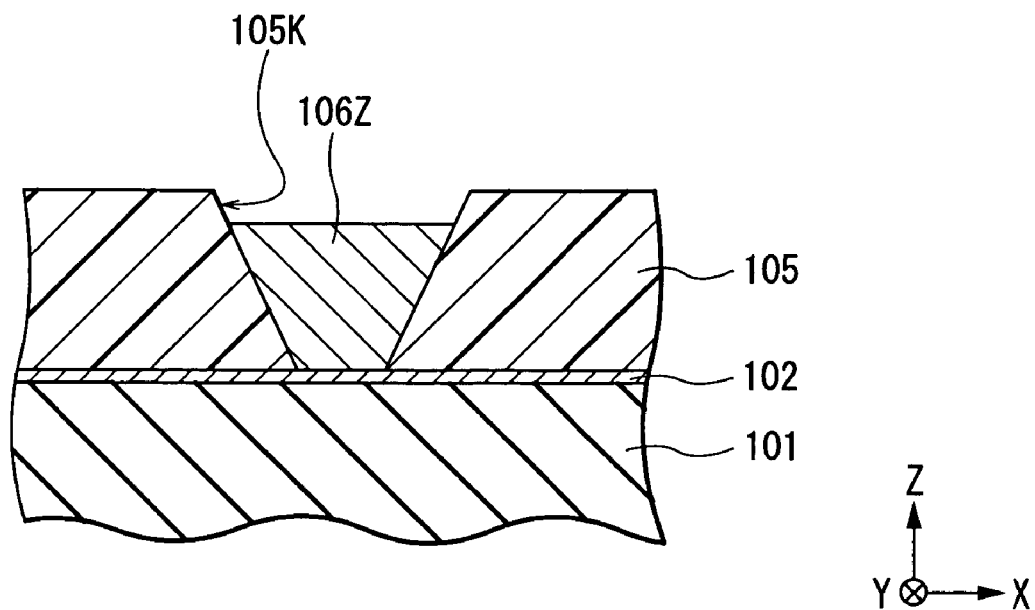
FIG. 39 is a sectional view for describing a step following the step of FIG. 38.
Figure 40:
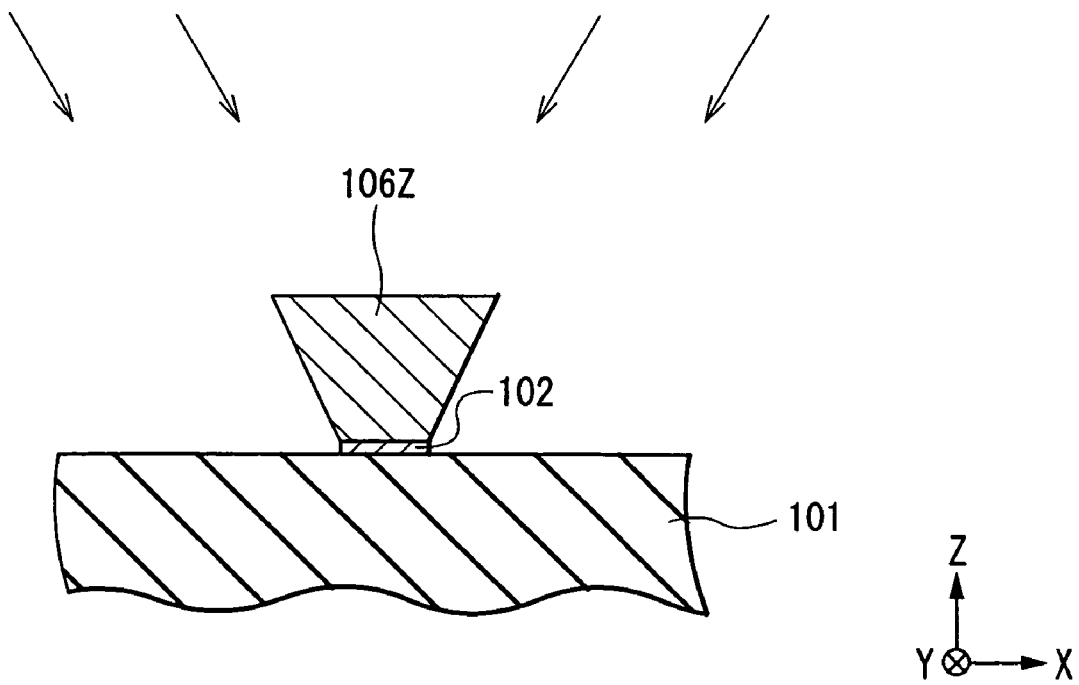
FIG. 40 is a sectional view for a step following the step of FIG. 39.

Secondly, for example, as shown in FIG. 35, after the precursor pole portion layer 13AZ (the center portion 13AZC) is formed, an insulating layer 37 is formed through, for example; sputtering or CVD so that the center portion 13AZC and its surroundings are coated with the insulating layer 37. After that, as shown in FIG. 36, the center portion 13AZC is polished together with the insulating layer 37 through, for example, CMP to be planarized, thereby the insulating layer 37 may be formed in the center portion 13AZC. Even in this case, the same effects as those in the embodiment can be obtained. In this case, specifically on the basis of the polishing amount of the center portion 13AZC, the shape of the exposed surface 20M can be controlled, so as in the case where the width of the center portion 13AZC is reduced through ion milling (refer to FIG. 34), the width W1 of the top edge E1 (trailing edge) can be controlled so as to have a desired width.

EXAMPLE

Next, examples of the invention will be described below.

When the relationship between the width WR of the frame portion 33R of the photoresist pattern 33 described in the embodiment and the base angle θR of the exposed surface 20M of the pole portion layer 13A formed by using the photoresist pattern 33 was examined, the results shown in Table 1 were obtained. Table 1 shows a relationship between the width WR of the frame portion 33R and the base angle θR of the exposed surface 20M. In Table 1, "no UV irradiation" means the case where only a heating process is performed to deform the photoresist pattern 33, and an ultraviolet irradiation process is not performed, and "UV irradiation" means the case where the heating process and the ultraviolet irradiation process are performed to deform the photoresist pattern 33.

In order to examine the relationship between the width WR and the base angle θR, the precursor pole layer portion 13AZ (the center portion 13AZC) was formed through the following steps on a trial basis. At first, after the seed layer 12 (made of Permalloy) with a thickness of 50 nm was formed on a AlTiC substrate (with a diameter of 6 inches and a thickness of 2 mm) as a base, the seed layer was coated with a photoresist (AZ5105P manufactured by Clariant) so as to form the photoresist film 31 with a thickness of 0.5 μm. Next, after the photoresist film 31 was heated (at heating temperature of 90° C. for a heating time of 90 seconds), the photoresist film 31 was patterned through photolithography by using the mask 32 including the frame portions 32R and 32L which determined the aperture 32K (the narrowest width of the aperture 32K was 0.18 μm) so as to form the photoresist pattern 33 including the frame portions 33R and 33L which determined the aperture 33K. When the photoresist pattern 33 was formed, a stepper NSR-TFHEX14C of Nikon was used, and as the exposure conditions, the numerical aperture (NA) of an optical system NA1 was 0.6; the numerical aperture of an illumination system NAi was 0.24; the numerical aperture of a lens system a was 0.4; and the amount of exposure was 15 mJ/cm$^2$, and after the photoresist film 31 was heated (at a heating temperature of 120° C. for a heating time of 120 seconds) before the developing process, a 2.38% solution of TMAH (tetrametylammonium hydroxide) was used as a developer liquid to perform the developing process (for a development time of 60 seconds). Next, the photoresist pattern 33 was heated so as to deform the frame portions 33R and 33L. When the photoresist pattern 33 was heated without ultraviolet irradiation, as the heating conditions, the heating temperature was 130° C. and the heating time was 10 minutes. On the other hand, when the photoresist pattern 33 was heated with ultraviolet irradiation, while applying ultraviolet rays (with a wavelength of 365 nm and an intensity of 800 W), as the heating conditions, the heating temperature was 100° C. and the heating time was 10 seconds. Finally, a plating bath (nickel iron bath) formed through adding iron (Fe) ions to a nickel (Ni) Watt's bath was used to grow a plating film (made of Permalloy) in the aperture 33K of the photoresist pattern 33, thereby the precursor pole portion layer 13AZ was formed so as to have a thickness of 0.3 μm. When the base angle θR was determined by using the precursor pole portion layer 13AZ, after the precursor pole portion layer 13AZ was cut through focused ion beam etching (FIB), the sectional structure of the precursor pole portion layer 13AZ was observed to measure the base angle θR.

TABLE 1

| WIDTH WR (μm) | BASE ANGLE θ R (°) | |
|---|---|---|
| | NO UV IRRADIATION | UV IRRADIATION |
| 1.0 | 89 | 90 |
| 1.5 | 87 | 90 |
| 3.0 | 83 | 86 |
| 5.0 | 79 | 81 |
| 10.0 | 73 | 76 |
| 30.0 | 66 | 70 |
| 50.0 | 65 | 68 |

It was obvious from the results shown in Table 1 that regardless of whether the ultraviolet irradiation process was performed or not, the base angle θR was gradually reduced with an increase in the width WR. Specifically, when the width WR was changed within a range of 1.0 μm to 50.0 μm, the base angle θR was changed within a range of 89° to 65° in the case where the ultraviolet irradiation process was not performed ("no UV irradiation") and within a range of 90° to 68° in the case where the ultraviolet irradiation process was performed ("UV irradiation"). As a result, it was confirmed that when the width WR of the frame portion 33R in the photoresist pattern 33 was adjusted, the base angle θR of the exposed surface 20M of the pole portion layer 13A finally formed could be controlled so as to have a desired angle. Specifically, it was confirmed that a relationship between the width WR of the frame portion 33R and the base angle θL was established between the width WL of the frame portion 33L and the base angle θL in the same manner, so when these relationships were used, the base angle θR and θL could be adjusted through adjusting the width WR of the frame portion 33R and the width WL of the frame portion 33L in the photoresist pattern 33, that is, the pole portion layer 13A could be formed so that the exposed surface 20M had an asymmetrical inverted trapezoidal shape.

Although the invention is described referring to the embodiment, the invention is not limited to the embodiment, and can be variously modified. More specifically, in the above embodiment, the invention is applied to a composite thin film magnetic head, but the invention is not limited to this, and can be applied to a thin film magnetic head for recording only comprising an inductive magnetic transducer for writing, and a thin film magnetic head comprising an inductive magnetic transducer for recording/reproducing. Moreover, the invention can be applied to a thin film magnetic head with a structure in which a device for recording and a device for reproducing are laminated in reverse order.

Further, in the embodiment, the invention is applied to the perpendicular recording system thin film magnetic head; however, the invention is not limited to this, and the invention can be the longitudinal recording system thin film magnetic head.

The method of forming a magnetic layer pattern and the method of manufacturing a thin film magnetic head according to the invention can be applied to a method of manufacturing a thin film magnetic head which is mounted in a hard disk drive for magnetically recording information on a hard disk or the like.

Obviously many modifications and variations of the present invention are possible in the light of the above teachings. It is therefore to be understood that within the scope of the appended claims the invention may be practiced otherwise than as specifically described.

What is claimed is:

1. A method of forming a magnetic layer pattern, the magnetic layer pattern extending to a predetermined extending direction, the method comprising:
   a first step of forming a photoresist pattern on a base layer so that the photoresist pattern includes a first frame portion and a second frame portion which face each other in a width direction and determine an aperture, and the first frame portion and the second frame portion have a different width from each other;
   a second step of heating the photoresist pattern so as to deform the first frame portion and the second frame portion so that the widths thereof are gradually increased toward the base layer, thereby the width of the aperture is gradually reduced toward the base layer;
   a third step of forming a magnetic layer pattern in the aperture by using the photoresist pattern; and
   a fourth step of removing the photoresist pattern,
   wherein the magnetic layer pattern is formed so that an end surface in the extending direction has a trapezoidal shape in which one edge determining a first base angle and a second base angle is a longer side in a pair of sides parallel to each other, and the other edge is a shorter side in the pair of sides, and the first base angle and the second base angle are different from each other.

2. A method of forming a magnetic layer pattern according to claim 1, wherein
   in the width direction, the first base angle is positioned corresponding to the first frame portion, and the second base angle is positioned corresponding to the second frame portion, and
   in the first step, the photoresist pattern is formed so that the first frame portion has a smaller width than the width of the second frame portion, thereby the pole portion is formed so that the first base angle is larger than the second base angle.

3. A method of forming a magnetic layer pattern according to claim 1, wherein
   in the width direction, the first base angle is positioned corresponding to the first frame portion, and the second base angle is positioned corresponding to the second frame portion, and
   in the first step, the photoresist pattern is formed so that the first frame portion has a larger width than the width of the second frame portion, thereby the pole portion is formed so that the first base angle is smaller than the second base angle.

4. A method of forming a magnetic layer pattern according to claim 1, wherein
   the photoresist pattern is formed of a chemical amplification photoresist, and
   while the photoresist pattern is heated, ultraviolet rays are applied to the photoresist pattern so as to deform the first frame portion and the second frame portion.

5. A method of forming a magnetic layer pattern according to claim 1, wherein
   a pole portion in a thin film magnetic head is formed as the magnetic layer pattern, the thin film magnetic head comprising a thin film coil generating a magnetic flux, and a pole layer extending from a recording-medium-facing surface which faces a recording medium moving in a direction of medium movement to the rear, and including the pole portion emitting the magnetic flux generated in the thin film coil to the recording medium, and
   the one edge is positioned in the direction of medium movement and the other edge is positioned in a direction opposite to the direction of medium movement.

6. A method of forming a magnetic layer pattern according to claim 5, wherein
   a precursor pole portion for forming the pole portion is pattern-formed at least in the aperture by using the photoresist pattern, and
   the precursor pole portion is polished from a side where the recording-medium-facing surface is formed to form the recording-medium-facing surface, thereby the pole portion is pattern-formed so as to have the end surface exposed to the recording-medium-facing surface.

7. A method of forming a magnetic layer pattern according to claim 6, wherein
   the precursor pole portion is etched from both width directions so as to reduce the width of the precursor pole portion.

8. A method of forming a magnetic layer pattern according to claim 6, wherein
   an insulating layer is formed so that the precursor pole portion and its surroundings are coated with the insulating layer, and
   the insulating layer and the precursor pole portion are polished so as to be planarized, thereby the insulating layer being formed around the precursor pole portion.

9. A method of forming a magnetic layer pattern according to claim 5, wherein
   the pole portion is formed so as to emit a magnetic flux for magnetizing the recording medium in a direction perpendicular to a surface of the recording medium.

10. A method of forming a magnetic layer pattern according to claim 6, wherein
    the precursor pole portion is formed in a peripheral area of the photoresist pattern as well as the aperture,
    after the photoresist pattern is removed, a mask is formed so that a portion of the precursor pole portion formed in the aperture is coated with the mask,
    the precursor pole portion is selectively etched by using the mask so as to remove a portion of the precursor pole portion formed in the peripheral area and leave the portion of the precursor pole portion formed in the aperture, and
    the mask is removed so as to expose the remaining precursor pole portion.

11. A method of forming a magnetic layer pattern according to claim 10, wherein
    the photoresist pattern is formed on a seed layer as the base layer,
    a plating film is grown by using the seed layer so as to form the precursor pole portion,
    after the photoresist pattern is removed, the seed layer is selectively etched by using the precursor pole portion as a mask so as to remove a portion of the seed layer which is not coated with the precursor pole portion and leave a portion of the seed layer which is coated with the precursor pole portion, and a portion of the precursor pole portion formed in the peripheral area and a portion of the seed layer which is coated with the portion of the precursor pole portion formed in the peripheral area are removed.

* * * * *